(12) United States Patent
Williams et al.

(10) Patent No.: US 7,583,425 B1
(45) Date of Patent: Sep. 1, 2009

(54) HIGH PERFORMANCE ADAPTIVE OPTICS WITH A RECONSTRUCTED COHERENT WAVE FRONT

(75) Inventors: Samuel G. Williams, Cupertino, CA (US); Ich V. Pham, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 243 days.

(21) Appl. No.: 11/804,540

(22) Filed: May 17, 2007

Related U.S. Application Data

(60) Provisional application No. 60/800,862, filed on May 17, 2006.

(51) Int. Cl.
*G02H 1/16* (2006.01)
(52) U.S. Cl. .............................. 359/29; 359/9; 359/900; 382/280; 356/457; 250/201.9
(58) Field of Classification Search ...................... 359/1, 359/9, 29, 900; 382/209–212, 217, 280; 356/450, 521, 457, 458; 250/201.9
See application file for complete search history.

(56) References Cited

U.S. PATENT DOCUMENTS

| | | | | |
|---|---|---|---|---|
| 5,276,636 | A * | 1/1994 | Cohn | 708/816 |
| 6,646,773 | B2 * | 11/2003 | Garner | 359/35 |
| 7,095,540 | B1 * | 8/2006 | Javidi et al. | 359/29 |

OTHER PUBLICATIONS

Roddier et al., Interferogram analysis using Fourier transform techniques, Applied Optics, May 1, 1987, pp. 1668-1673, vol. 26, No. 9, Optical Society of America.

Takeda et al, Fourier-transform method of fringe-pattern analysis for computer-based topography and interferometry, J. Opt. Soc. Am., Jan. 1982, pp. 156-160, vol. 72, No. 1, Optical Society of America.

Rhoadarmer, Development of a self-referencing interferometer wavefront sensor, Proc. Of SPIE, 2004, pp. 112-126, vol. 5553, SPIE, Bellingham, Washington.

* cited by examiner

*Primary Examiner*—Stephone B Allen
*Assistant Examiner*—Jennifer L Doak
(74) *Attorney, Agent, or Firm*—McDermott Will & Emery LLP

(57) ABSTRACT

An adaptive optics system comprises a beamsplitter configured to divide an incoming beam with an aberrated wave front into a first input beam and a second input beam, a microelectromechanical system configured to reflect the first input beam onto an image plane, and a self-reference wave front generator configured to spatially filter the second input beam to form a reference beam, and to interfere the reference beam with the first input beam on the image plane to form a hologram. The system further comprises an imaging device configured to capture an image of the hologram on the image plane, and one or more processors. The one or more processors are configured to perform the steps of Fourier transforming the captured image to generate a transform including a first object image, a conjugate object image, and an auto-correlation image, truncating the transform to exclude the conjugate object image and the auto-correlation image, inverse Fourier transforming the truncated transform to generate amplitude and phase information about the aberrated wave front, generating control signals for mitigating aberrations in the aberrated wave front via phase conjugation based on the amplitude and phase information, and providing the control signals to the microelectromechanical system.

20 Claims, 14 Drawing Sheets

HIGH PERFORMANCE ADAPTIVE OPTICS WITH A RECONSTRUCTED COHERENT WAVE FRONT

CROSS-REFERENCE TO RELATED APPLICATION

The present application claims the benefit of priority under 35 U.S.C. § 119 from U.S. Provisional Patent Application Ser. No. 60/800,862 entitled "HIGH PERFORMANCE ADAPTIVE OPTICS FOR RECONSTRUCTING A COHERENT WAVE FRONT," filed on May 17, 2006, the disclosure of which is hereby incorporated by reference in its entirety for all purposes.

STATEMENT REGARDING FEDERALLY SPONSORED RESEARCH OR DEVELOPMENT

Not applicable.

FIELD OF THE INVENTION

The present invention generally relates to adaptive optics and, in particular, relates to high performance adaptive optics systems and methods.

BACKGROUND OF THE INVENTION

Adaptive optics ("AO") are used to control deformable mirrors to compensate for phase aberrations introduced, for example, by the turbulence in the Earth's atmosphere or by the optical elements between a distant object and its local sensor. Various low speed AO systems use a Shack Hartmann sensor and a least square reconstructor to control a continuous deformable mirror. Such systems are incapable of operating at higher frame rates, because of the processing overhead of the least square reconstructor. Accordingly, such systems are of little or no use in dynamically scintillated conditions.

SUMMARY OF THE INVENTION

The present invention solves the foregoing problems by providing high performance adaptive optics systems and methods which can correct phase aberrations at very high frame rates, making them suitable for use in dynamically scintillating conditions. A coherent hologram is formed by interfering an incoming aberrated beam with a tilted self reference beam. The Fourier transform of the hologram produces an image in a focal plane, which is truncated and inverse Fourier transformed to provide the pupil wave front phase and amplitude. A processor uses the information about the phase and amplitude of the pupil wave front to control a pixelated MicroElectroMechanical System ("MEMS") at very high frame rates (e.g., 10 kHz).

According to one embodiment of the present invention, an adaptive optics system comprises a beamsplitter configured to divide an incoming beam with an aberrated wave front into a first input beam and a second input beam, a microelectromechanical system configured to reflect the first input beam onto an image plane and a self-reference wave front generator configured to spatially filter the second input beam to form a reference beam, and to interfere the reference beam with the first input beam on the image plane to form a hologram. The system further comprises an imaging device configured to capture an image of the hologram on the image plane, and one or more processors. The one or more processors are configured to perform the steps of Fourier transforming the captured image to generate a transform including a first object image, a conjugate object image, and an auto-correlation image, truncating the transform to exclude the conjugate object image and the auto-correlation image, inverse Fourier transforming the truncated transform to generate amplitude and phase information about the aberrated wave front, generating control signals for mitigating aberrations in the aberrated wave front via phase conjugation based on the amplitude and phase information, and providing the control signals to the microelectromechanical system.

According to one aspect of the present invention, a method of performing closed loop correction of phase aberrations comprises the steps of: dividing an incoming beam with an aberrated wave front into a first input beam and a second input beam; reflecting, with a microelectromechanical system, the first input beam onto an image plane; spatially filtering the second input beam to form a reference beam, interfering the reference beam with the first input beam on the image plane to form a hologram; capturing an image of the hologram on the image plane; Fourier transforming the captured image to generate a transform including a first object image, a conjugate object image, and an auto-correlation image; truncating the transform to exclude the conjugate object image and the auto-correlation image; inverse Fourier transforming the truncated transform to generate amplitude and phase information about the aberrated wave front; generating control signals for mitigating aberrations in the aberrated wave front via phase conjugation based on the amplitude and phase information; and providing the control signals to the microelectromechanical system.

According to one embodiment of the present invention, a machine-readable medium carries one or more sequences of instructions for performing closed loop correction of phase aberrations. Execution of the one or more sequences of instructions by one or more processors causes the one or more processors to perform the steps of: capturing an image of a hologram formed by interfering a first input beam with a desirably tilted reference beam; Fourier transforming the captured image to generate a transform including a first object image, a conjugate object image, and an auto-correlation image; truncating the transform to exclude the conjugate object image and the auto-correlation image; inverse Fourier transforming the truncated transform to generate amplitude and phase information about an aberrated wave front of the first input beam; generating control signals for mitigating aberrations in the aberrated wave front via phase conjugation based on the amplitude and phase information; and providing the control signals to a microelectromechanical system.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
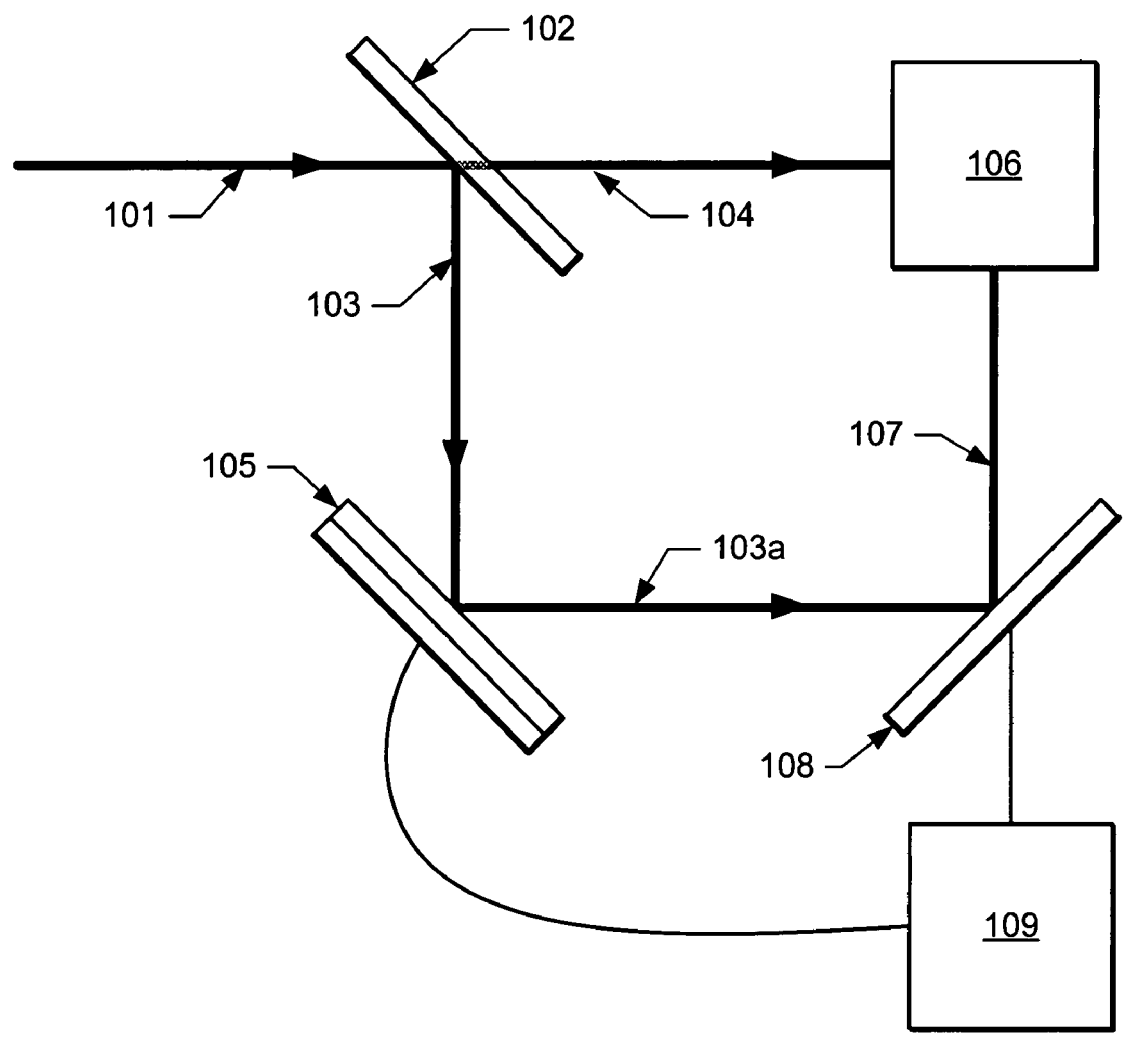
FIG. 1 illustrates an adaptive optics system in accordance with one embodiment of the present invention.

FIG. 1 illustrates an adaptive optics system according to one embodiment of the present invention. The adaptive optics system includes a beamsplitter 102, which splits an incoming beam 101 with an aberrated wave front into two identical beams 103 and 104. Beam 103 is reflected off of MEMS 105 onto an image plane of imaging device 108. Beam 104 is spatially filtered by a self-reference wave front generator ("SRWG") 106 to produce a reference beam 107 with a flat phase. Reference beam 107 is directed by SRWG 106 onto the image plane, where it is interfered with the beam 103a reflected off of MEMS 105 to form a hologram. An image of the hologram is captured by imaging device 108, which provides the image to processor 109. In accordance with various aspects of the present invention, imaging device 108 may be a CCD, a CMOS, or any other imaging device known to those of skill in the art.

In accordance with one aspect of the present invention, SRWG 106 includes a single mode fiber. The single mode fiber has a geometry that permits only a lowest order mode (i.e., the lowest order solution to the wave equation that satisfies the boundary conditions) to travel through the fiber. All other higher modes either radiate or dissipate at the boundary of the single mode fiber.

In accordance with another aspect of the present invention, SRWG 106 may further include an optical amplifier configured to amplify the output of the single mode fiber, as described in greater detail below.

In accordance with another aspect of the present invention, SRWG 106 further includes a mechanism for desirably tilting reference beam 107 by $\pm\phi_{tilt}$ to ensure the separation of an object image produced thereby from an auto-correlation image, as described in greater detail below. For example, in accordance with one embodiment, a programmable phase shifter may be used to desirably phase shift or "tilt" the output of the single mode fiber. Alternatively, a tilted mirror may be used to tilt reference beam 107 prior to interfering reference beam 107 with reflected beam 103a.

In accordance with one aspect of the present invention, incoming beam 101, represented below by $U_{obj}$, has a wave front with unknown amplitude $A_{obj}$ and phase $e^{i\phi_{obj}}$:

$$U_{obj}(\vec{r}) = A_{obj}(\vec{r})e^{i\phi_{obj}(\vec{r})} \qquad (1)$$

This wave front is interfered with the reference beam 107 output from self-reference wave front generator 106, $U_{ref}$, which has a known uniform amplitude $A_{ref}$ and desirably tilted phase $e^{i\phi_{tilt}}$:

$$U_{ref}(\vec{r}) = A_{ref}(\vec{r})e^{i\phi_{tilt}(\vec{r})} \qquad (2)$$

The resultant hologram is the intensity of the combined wave fronts:

$$I_{holo}(\vec{r}) = (U_{obj} + U_{ref})(U_{obj} + U_{ref})^* \qquad (3)$$

$$I_{holo}(\vec{r}) = U_{obj}U_{ref}^* + U_{obj}^*U_{ref} + U_{obj}U_{obj}^* + U_{ref}U_{ref}^* \qquad (4)$$

Figure 2:
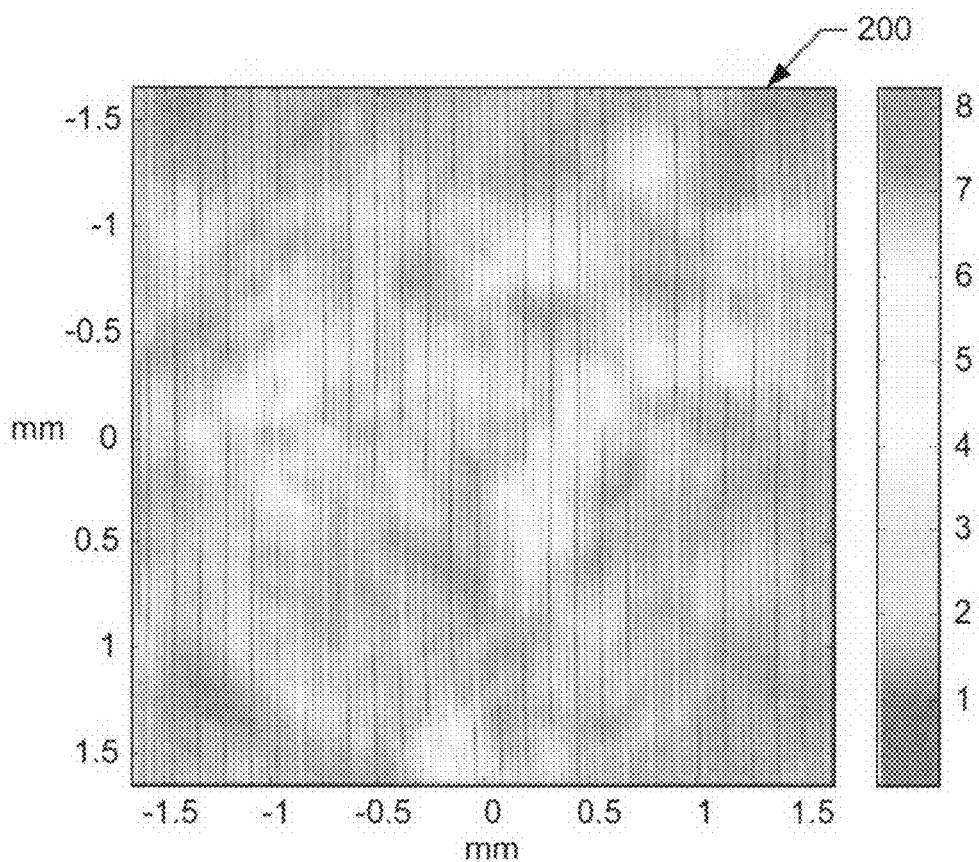
FIG. 2 illustrates an image of a hologram formed in an adaptive optics system in accordance with one aspect of the present invention.

The first term of the above equation is the object $U_{obj}$ tilted by $-\phi_{tilt}$. The second term is the conjugate object $U_{obj}^*$ tilted by $\phi_{tilt}$. The last two terms are the combined intensities of the two wave fronts. FIG. 2 shows the hologram of the tilted wave front in accordance with the present exemplary embodiment. The hologram 200 in FIG. 2 represents the combination of the aberrated and the tilted reference wave fronts, for the scintillated condition of $D/r_0 = 5.3$, which is the ratio of pupil diameter D over the turbulent strength $r_0$. The intensity rytov variance in the present exemplary embodiment is 0.63. The fringes in hologram 200 relate to the reference tilt $\phi_{tilt}$. In this case, $\phi_{tilt}$ is selected to be equal to 5N/16 waves per grid width and there are N grid points across the width. This results into about three grid points between the fringes. These parameters are selected so that the sample hologram does not violate the spatial Nyquist criteria and contains sufficient information for image and wave front reconstructions.

While the foregoing exemplary embodiment has been described with reference to particular values for the parameters of the pupil diameter and the reference tilt, the scope of the present invention is not limited to this particular arrangement. Rather, as will be apparent to one of skill in the art, the present invention has application to AO systems in which any desired amount of reference tilt is provided by a SRWG, and in which pupil diameters of any value may be selected.

Figure 3:
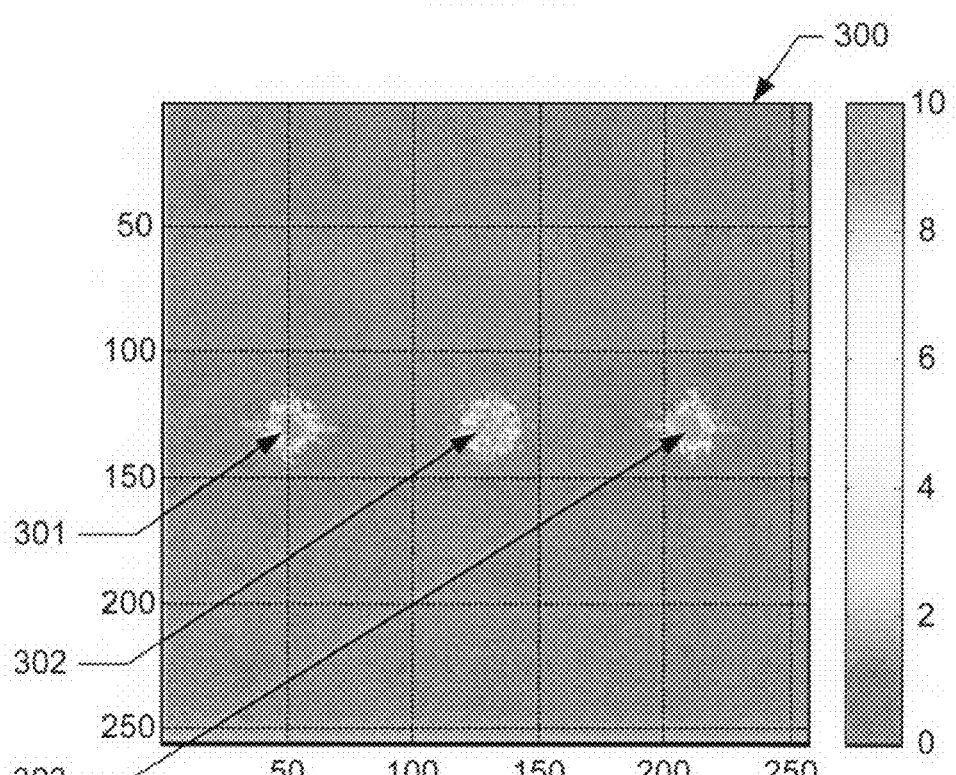
FIG. 3 illustrates a Fourier transform of a hologram formed in an adaptive optics system in accordance with one aspect of the present invention.

Processor 109 is configured to perform several processing steps on the captured hologram image 200 to reconstruct the wave front of incoming beam 101. First, processor 109 performs a fast Fourier transform ("FFT") on the hologram image 200 to generate a transform (such as transform 300 in FIG. 3) which includes an object image 301, its conjugate 303, and an auto-correlation image 302. The mathematical derivation of this step is set forth below:

$$U_{holo}(\vec{k}) = \Im(I_{holo}(\vec{r})) \tag{5}$$

where $\Im$ denotes the two-dimensional Fourier transform, $\vec{k}$ is the spatial frequency vector, and $U_{holo}(\vec{k})$ is the complex N by N matrix. As can be seen in FIG. 3, transform 300 contains three images: the center image 302 is the Fourier transform of the combined intensities or the sum of the auto-correlation functions, the left image is the object image 301, and the right image 303 is its conjugate twin. The offset distance $N_{offset}$ between the images is determined by the tilt of the reference wave front, and in this case is 5N/16 frequency grid points.

In accordance with one aspect of the present invention, the derivation for $N_{offset}$ is as follows:

$$\Delta x = \frac{D}{N} \tag{6}$$

where $\Delta x$ is the spatial grid resolution, D is the spatial grid width and N is the number of grid points. The frequency grid width is just the inverse of the spatial grid resolution:

$$D_f = \frac{1}{\Delta x} = \frac{N}{D} \tag{7}$$

Similarly, the frequency grid resolution is the ratio of the frequency grid width over the number of grid points:

$$\Delta f = \frac{D_f}{N} = \frac{1}{D} \tag{8}$$

The number of grid points between images is the ratio of the tilt over the frequency grid resolution:

$$N_{offset} = \frac{\phi_{tilt}}{\Delta f} = \phi_{tilt} D = \left(\frac{\frac{5N}{16}}{D}\right) D = 5\frac{N}{16} \tag{9}$$

In order to obtain the pupil wave front, the transformed imaged is first truncated to include only the object image 301 (i.e., excluding the conjugate object image 303 and the auto-correlation image 302), represented in Equation 4 by $U_{obj} U_{ref}^*$. The truncated transform then undergoes an inverse fast Fourier transform ("IFFT") to reconstruct the pupil wave front. For example, in one exemplary embodiment of the present invention in which N=256, the captured hologram image is a 256×256 pixel image, which undergoes a 256×256 2D fast Fourier transform to provide a 256×256 transformed image. The transformed image is truncated to 64×64 pixels, to exclude the auto-correlation image 302 and the conjugate object image 303. This truncated transformed image then undergoes a 64×64 2D inverse fast Fourier transform to produce a reconstructed pupil wave front, as mathematically illustrated below, in accordance with one aspect of the present invention.

While the step of truncating has been described herein as "isolating" the object image from its conjugate and the auto-correlation image, it is expressly contemplated that the object image may not be completely free of information from an outside edge of the auto-correlation image. Accordingly, the terms "isolation," "isolating" and/or "isolated" are not to be understood as requiring the truncated image to be entirely free of information from the auto-correlation image, as described in greater detail below.

The object image is related to the hologram image:

$$U_{obj}(\vec{k}, m_1, n_1) = U_{holo}(\vec{k}, m_2, n_2) \tag{10}$$

where $$m_1, n_1 = 1 \rightarrow N/4 \tag{11}$$

$$m_2 = \left(\frac{N}{2} - \frac{N}{8} + 1\right) \rightarrow \left(\frac{N}{2} + \frac{N}{8}\right) \tag{12}$$

$$n_2 = \left(\frac{N}{2} - \frac{N}{8} + 1 - N_{offset}\right) \rightarrow \left(\frac{N}{2} - \frac{N}{8} - N_{offset}\right) \tag{13}$$

and $U_{obj}(\vec{k})$ is the complex N/4 by N/4 matrix. By inverse Fourier transforming $U_{obj}(\vec{k})$, the wave front is reconstructed as illustrated in Equation 14:

$$\hat{U}_{obj}(\vec{r}) = \Im^{-1}(U_{obj}(\vec{k})) \tag{14}$$

Figure 4:
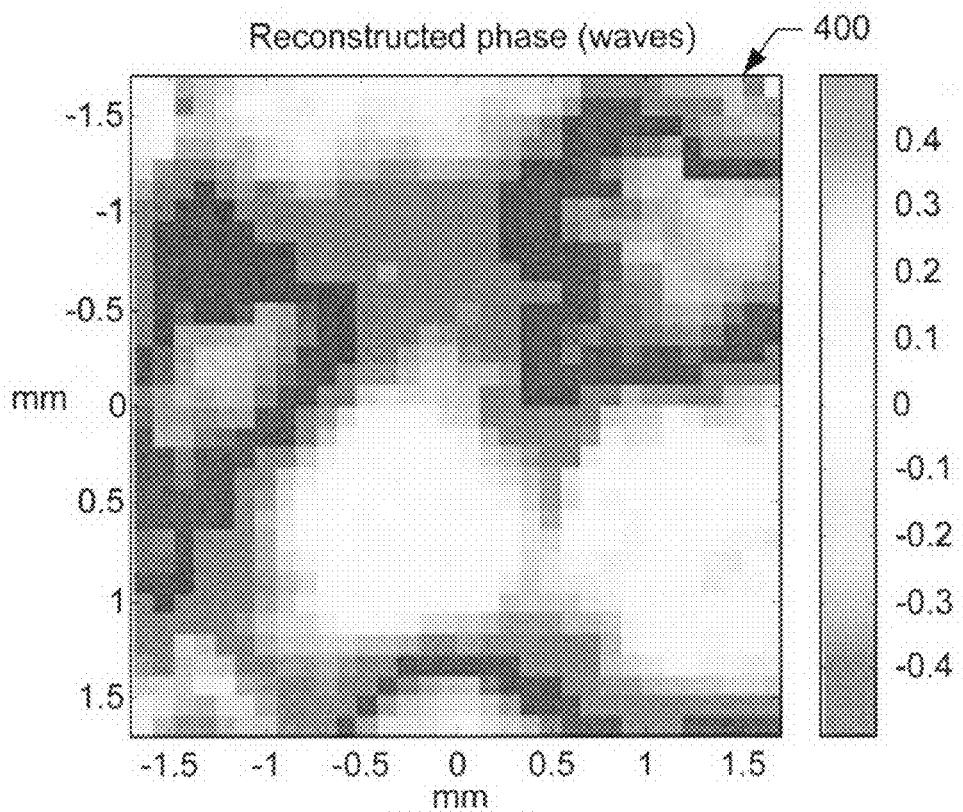
FIGS. 4 and 5 illustrate the phases of a reconstructed wave front and an original aberrated wave front in accordance with one aspect of the present invention.
Figure 5:
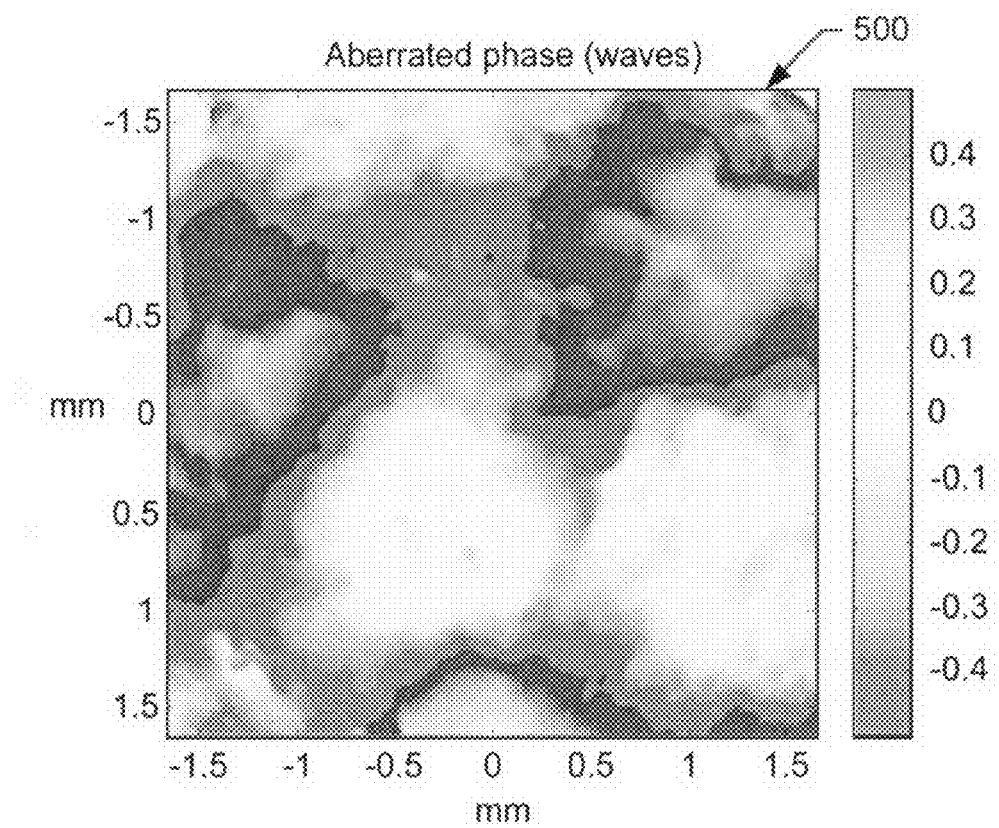
Figure 6:
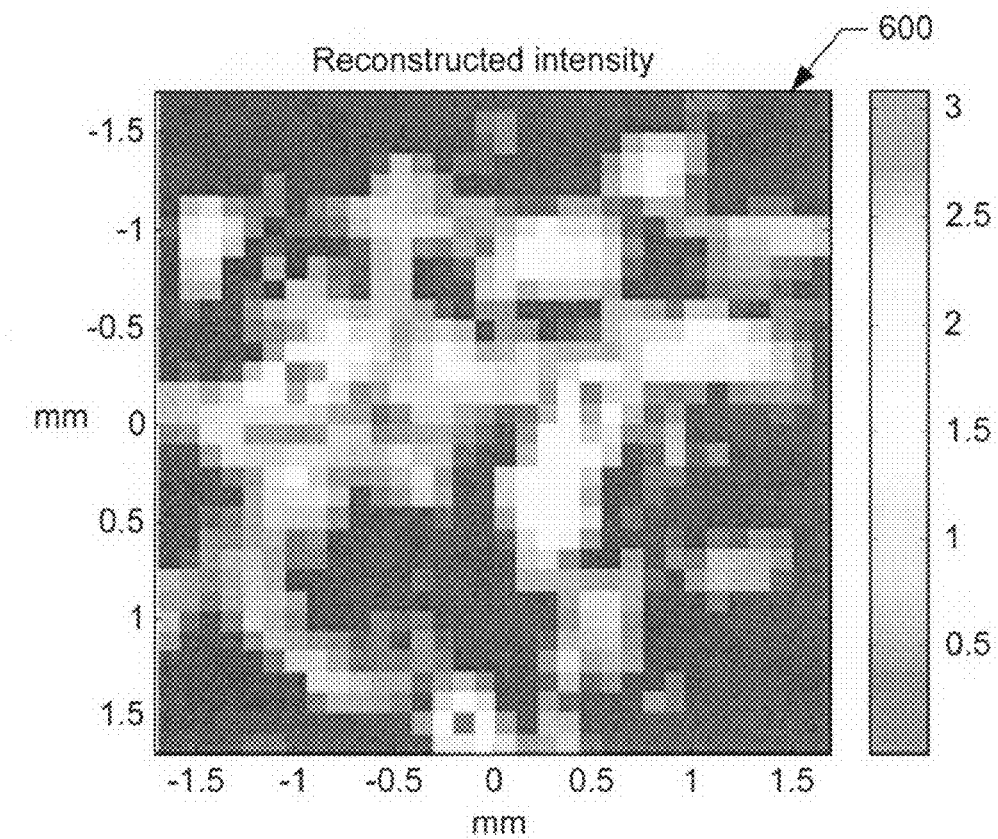
FIGS. 6 and 7 illustrate the amplitudes of a reconstructed wave front and an original aberrated wave front in accordance with one aspect of the present invention.
Figure 7:
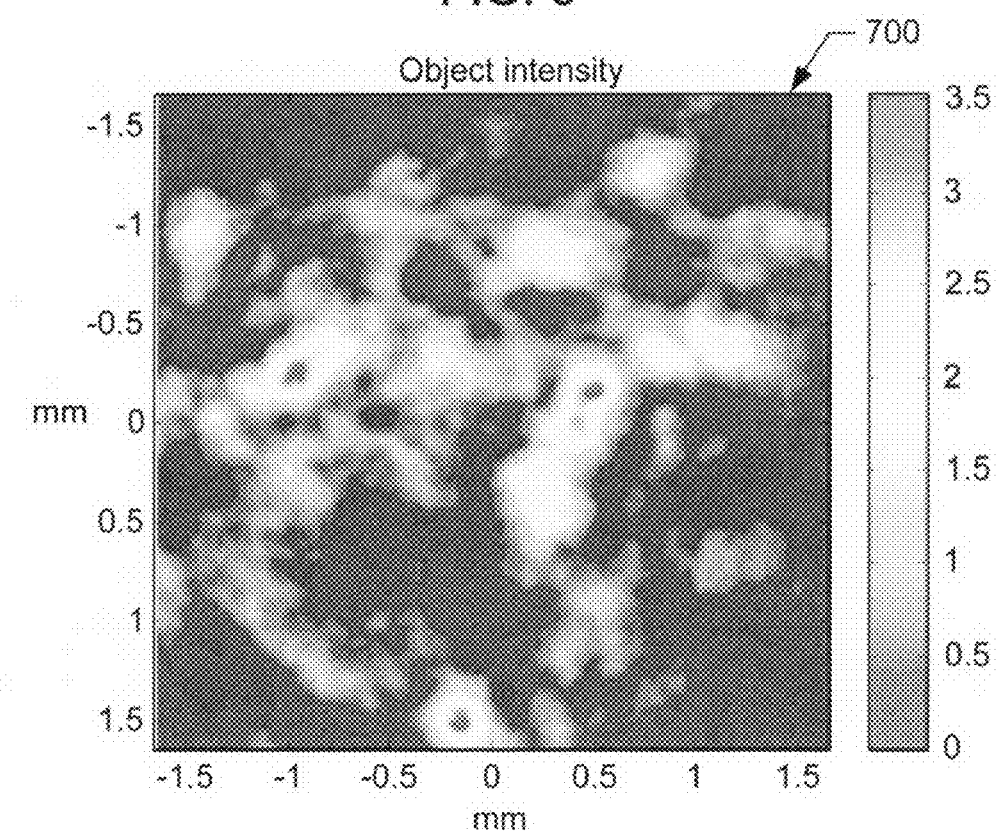

The phase aberrations of one such reconstructed 64×64 pixel wave front 400 are shown in FIG. 4, in accordance with one aspect of the present invention in which $D/r_0=5.3$ (a typical parameter for many AO operations). As can be seen when comparing the reconstructed wave front 400 of FIG. 4 with the original aberrated wave front 500 of FIG. 5, the method of the foregoing aspect of the present invention is capable of very accurately reconstructing the phase information of the wave front of the incoming aberrated beam. Similarly, the intensity aberrations of the same reconstructed wave front 600 are shown in FIG. 6. As can be seen when comparing the reconstructed wave front 600 of FIG. 6 with the original aberrated wave front 700 of FIG. 7, the method of the foregoing aspect of the present invention is capable of very accurately reconstructing the intensity (i.e., amplitude) information of the wave front of the incoming aberrated beam. The slight differences between these respective pairs of figures are the result of averaging 8×8 incoming pixels into one reconstructed sub-aperture pixel. The size of the reconstructed wave front is only N/4 by N/4 compared to the N by N size of the incoming wave front. Nevertheless, the reconstructed pixel values match well with the average values of the incoming pixels. Essentially, the reconstructed wave front is a filtered version of the aberrated wave front.

Figure 8:
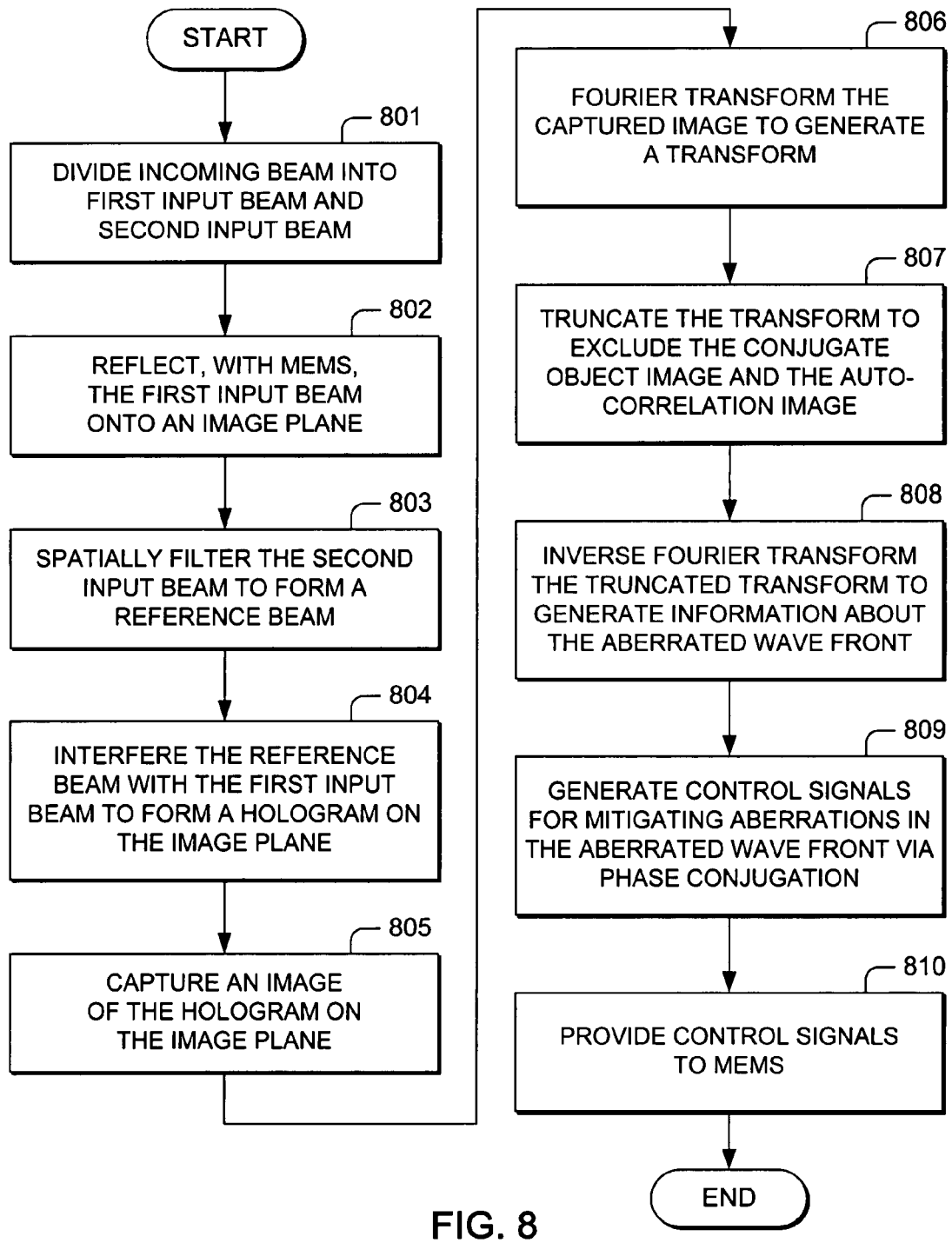
FIG. 8 is a flowchart illustrating a method of performing closed loop correction of phase aberrations in accordance with one aspect of the present invention.

FIG. 8 is a flowchart illustrating a method of performing closed loop correction of phase aberrations in accordance with one aspect of the present invention. The method begins in step 801, in which an incoming aberrated beam is divided into first and second input beams. In step 802, the first input beam is reflected by a MEMS onto an image plane. In step 803, the second input beam is spatially filtered by a self-reference wave front generator to form a desirably tilted reference beam. In step 804, the reflected first input beam is interfered with the reference beam on the image plane to form a hologram. In step 805, an image of the hologram is captured with an image recording device, such as a CCD, CMOS or other camera. In step 806, the captured image is Fourier transformed to generate a Fourier transform that contains the object image, its conjugate, and an auto-correlation image. In step 807, the transform is truncated to exclude the conjugate object image and the auto-correlation image. In step 808, the truncated transform is inverse Fourier transformed to generate information about the aberrated wave front. This information includes both phase and amplitude information about the aberrations of the incoming beam.

In step 809, the phase and amplitude information is used to generate control signals provided to the MEMS to mitigate the aberrations via phase conjugation. For either a 256-actuator or a 1024-actuator MEMS, the processor averages the resulting 64×64 image into 16×16 or 32×32 phase errors, respectively. The processor calculates the control signals based on the phase errors and applies them to the driver of the MEMS in step 810, moving the MEMS actuators to minimize the wave front phase errors.

While in the foregoing exemplary embodiment of the present invention, the MEMS is described with reference to particular numbers and configurations of actuators, the scope of the present invention is not limited to these specific arrangements. Rather, as will be readily apparent to one of skill in the art, the adaptive optics system of the present invention has application to MEMS with any number of actuators, or to any other controllably deformable mirror.

In accordance with one aspect of the present invention, the reconstruction of an aberrated wave front as described above can be performed with sufficient speed to allow for real time correction of an aberrated beam with high performance adaptive optics. For example, in the exemplary embodiment of the present invention in which N=256, the image reconstruction requires 256×256 2D fast Fourier transform. Processor 109 (e.g., a 600 MHz Analog Devices TigerSHARC®) can perform a 256-point complex FFT in about 0.98 µs. The real N point FFT is obtained by performing a complex N/2 point FFT with an additional stage that requires very low overhead. Therefore, the 2D FFT execution time for a quad TigerSHARC® board is as follows:

$$T_{FFT} = \frac{1}{4}\left(N \times \frac{0.98}{2} \times \frac{\log_2(2^{N-1})}{\log_2(2^N)} + \frac{N}{4} \times 0.98\right) = 42.9 \text{ µs} \tag{15}$$

N/4 is used for the second term, as the size of the required image is only 64×256.

Similarly, the execution time of the IFFT performed on the truncated image can be approximated as follows:

$$T_{IFFT} = \frac{2(N/4)T_{64}}{4} \tag{16}$$

where $T_{64}$ is the execution time of the 64 point complex FFT. Thus, $T_{IFFT}$=11.8 µs for the condition where $T_{64}$=0.37 µs. In an exemplary embodiment in which processor 109 communicates with imaging device 108 through two link ports at 2 GBytes/s, the time for the transfer is calculated by:

$$T_{xfer} = \frac{N^2}{4 \times 10^9} = 16.4 \text{ µs} \tag{17}$$

Thus, the total execution time per frame is the sum of $T_{FFT}$, $T_{IFFT}$ and $T_{xfer}$:

$$T_{total} = T_{FFT} + T_{IFFT} + T_{xfer} \approx 71 \text{ µs} \tag{18}$$

This execution time of 71 µs per frame easily allows for a 10 kHz frame rate (i.e., as 71 µs is less than the maximum 100 µs per frame allowable for a 10 kHz frame rate).

While the foregoing exemplary aspect of the present invention is described with reference to hologram images and transformed images with specific image sizes (e.g., 256×256 and 64×64), the scope of the present invention is not limited to these particular arrangements. Rather, as will be apparent to one of skill in the art, the present invention has application to hologram images and transformed images of any resolution.

While the results shown in the foregoing exemplary aspects are very good, it is worthwhile to note that there are several sources which contribute to the small error in the reconstructed wave front. The sources of error include: (i) the spatial low pass filter (i.e., the FFT/IFFT process), (ii) the overlapping auto-correlation image in the truncated transform, (iii) the spatial Nyquist sampling error, (iv) the sensor noise and quantization, (v) the shifted image contributed by the tilt of the aberrated wave front, (vi) the boundary problem presented by a circular aperture, and (vii) the amplifier of the self reference wave front generator.

Spatial Low Pass Filter

Fundamentally, the FFT and IFFT operations perform as spatial low pass filters ("SLPF"). The 256×256 input is used to reconstruct the 64×64 wave front, which is then averaged to obtain 32×32 sub-apertures. This results into the following spatial Nyquist frequency:

$$f_{nyquist} = \frac{1}{2}f_s = \frac{1}{2}\frac{256}{32} = 4 \text{ waves per } d \tag{19}$$

where d is the sub-aperture length. The size of the reconstructed wave front is reduced by a factor of four. Therefore, it only contains the spatial frequency less than one-wave per d. This is acceptable, however, as the closed loop AO operation does not need to correct for higher frequencies. The actuator spacing is selected to be d so that it is smaller than the atmospheric coherent length $r_0$. This means that the turbulent spatial frequency will always be less than one-wave per d.

Overlapping Auto-Correlation Image

In accordance with one aspect of the present invention, the truncated transform may include portions of the center auto-correlation image (indicated by reference 302 in FIG. 3), which is the Fourier transform of the sum of intensities as shown below:

$$U_{center}(\vec{k}) = \Im(U_{obj}U_{obj}^* + U_{ref}U_{ref}^*) \tag{20}$$

For the typical condition where $A_{ref} \gg A_{obj}$, Equation 20 can be approximated as:

$$U_{center}(\vec{k}) = \Im(U_{ref}U_{ref}^*) \tag{21}$$

The reference wave front has a Gaussian distribution:

$$U_{ref}(\vec{r}) = A_{ref}e^{-\alpha_r r^2} \tag{22}$$

Therefore, $$U_{center}(\vec{k}) = \Im(A_{ref}^2 e^{-2\alpha_r r^2}) = A_{ref}^2 \sqrt{\frac{\pi}{2\alpha_r}} e^{\frac{-\pi f^2}{2\alpha_r}} \tag{23}$$

If the time constant for the reference Gaussian beam is selected to be 3N/4 grid points, then $$\alpha_r = \left(\frac{4}{3N\Delta x}\right)^2 \tag{24}$$

Therefore, $$U_{center}(\vec{k}) = A_{ref}^2 \frac{3N\Delta x}{4} \sqrt{\frac{\pi}{2}} e^{-\frac{\pi}{2}\left(\frac{3N\Delta x}{4}f\right)^2} \tag{27}$$

To calculate the center image at the boundary edge of the object image, where $$f_{edge} = \frac{3N}{16}\Delta f = \frac{3N}{16}\frac{1}{N\Delta x} = \frac{3}{16\Delta x} \tag{26}$$

Equation 25 can be rewritten as:

$$U_{center}(f_{edge}) = A_{ref}^2 \frac{3N\Delta x}{4} \sqrt{\frac{\pi}{2}} e^{-\frac{\pi}{2}\left(\frac{9N}{64}\right)^2} \tag{27}$$

For the embodiment in which N=256, the above value for $U_{center}$ becomes very negligible, and the error contribution by the overlapping image can be ignored.

Spatial Nyquist Sampling Error

According to one aspect of the present invention, in order to reconstruct the wave front, the hologram adjacent sample points must meet the Nyquist criteria, which is less than half of the wave. In the foregoing exemplary embodiment, the distance between fringes is one wave. For 256 sample points and a 32×32 MEMS, the Nyquist criteria is violated if the phase across the sub-aperture is larger than four waves. This may only occur at very few sample points in the very scintillated turbulence. Therefore, its error contribution can be ignored.

Sensor Quantization and Noise

In accordance with one aspect of the present invention, the SLPF reduces sensor noise bandwidth. In fact, it decreases the noise contribution by approximately a factor of 2 as the bandwidth is reduced by factor of 4. The term "sensor quantization" refers to the number of digital bits representing the fringe measurement. Mathematically, sensor quantization can be modeled as noise. Therefore, the SLPF also desensitizes the quantization error. Nevertheless, as shown below, 8-bit sensor quantization is sufficient for the AO operation. The 8-bit embodiment still has a safety margin built-in, as the performance degradation only occurs at 6-bit or lower resolution. It is also important to require 8-bit or less so that the data transfer rate between sensor and the microprocessor is reasonably low and easily realizable.

Tilted Aberrated Beam

In accordance with one aspect of the present invention, the location of the hologram image is precisely known only if there is no tilt in the incoming beam. In extremely scintillated conditions, however, the tilt can be as high as 16 waves, and the center of the image can be further shifted by an additional 16 grid points. This means that the cutoff frequency for the SLPF is reduced from one-wave to about 0.75 waves per d. This is still less than the coherent length, however, and is therefore acceptable. In addition, as in many other AO systems, a separate loop can be used to compensate for the tilt. Moreover, an adaptive algorithm can adjust the truncated location as the function of the incoming tilt. These approaches can maintain the SLPF cutoff frequency at one wave per sub-aperture.

Boundary Problem

In the foregoing exemplary configurations, a 2D FFT is performed on a 256×256 square hologram to produce a transform. This works very well for an AO system that uses a square MEMS. For systems using a circular aperture, however, the discontinuity at the edge of the interferogram can produce large ripples in the spatial image plane. In accordance with one embodiment of the present invention, this is compensated for by symmetrically extending the hologram along the fringe direction before using the sample data in the FFT/IFFT process.

Self Reference Wave Front Generator

As outlined in greater detail above, the hologram includes the intensity of the combined wave fronts (i.e., the aberrated beam and its self reference). In accordance with one aspect of the present invention, coherent detection of the hologram requires that the reference phase must be flat. By focusing the reference beam into a single mode fiber, the reference beam can be spatially filtered and a flat phase produced at the output. Because this process can greatly reduce the intensity of the reference beam however, an optical amplifier may be needed to boost the power output of the single mode fiber. As will be apparent to one of skill in the art, however, with the addition of an amplifier comes the addition of noise to the system. Despite this additional noise, however, the coherent detection algorithm outlined above can work very well, as it is highly resilient to low SNR conditions.

In accordance with one exemplary experimental embodiment of the present invention, an adaptive optics system was modeled in Matlab® to simulate the AO performance. The following results are for a 16×16 pixelated MEMS (due to the limitations of the Matlab® work space and the resolution required for the pixelated MEMS). Such a 256-actuator MEMS is sufficient to show the AO capability for correcting temporal variation with a high frame rate. It is expected that the performance will be slightly improved for a 1024-actuator MEMS, as the spatial error will be smaller.

First Test Case:

TABLE 1

| | |
|---|---|
| Actuator spacing | d = 0.275 mm |
| Aperture width | D = 4.4 mm |
| Turbulent strength | $r_0$ = 0.83 mm |
| Rytov variance | $\sigma_r$ = 0.62 |
| Sampling frequency | $f_s$ = 10 kHz |
| Controller bandwidth | $f_{bw}$ = 1 kHz |
| Greenwood frequency | $f_G$ = 0.63 kHz |
| Tyler frequency | $f_T$ = 0.1 kHz |

Figure 9:
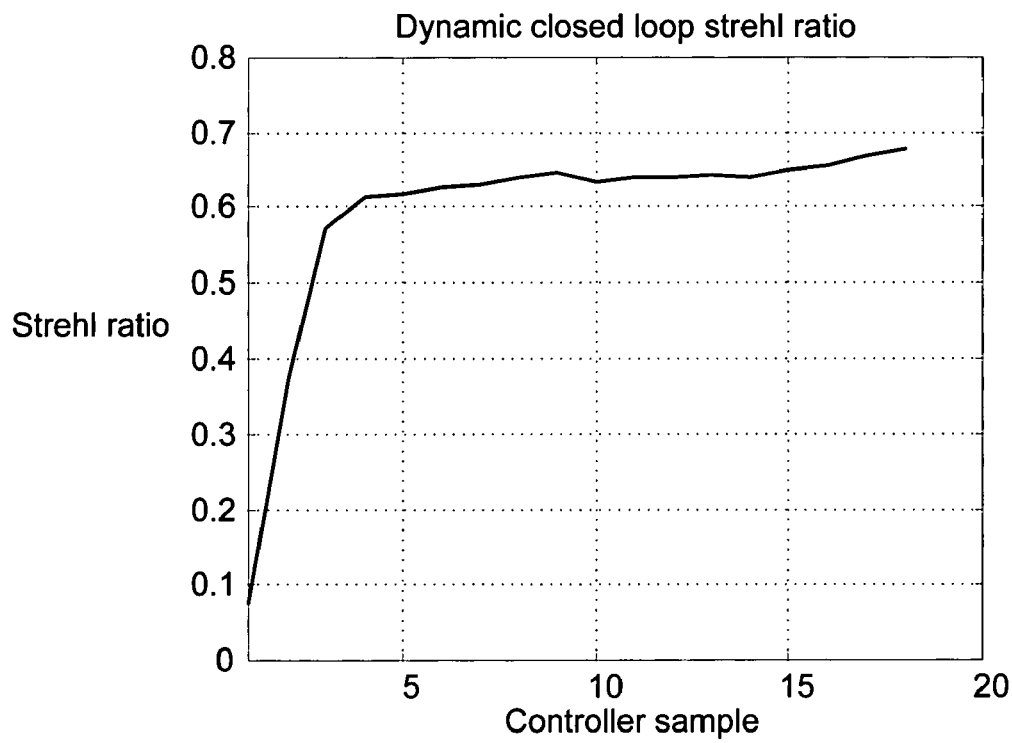
FIGS. 9 and 10 are graphs illustrating various performance advantages of an adaptive optics system in accordance with one aspect of the present invention.
Figure 10:
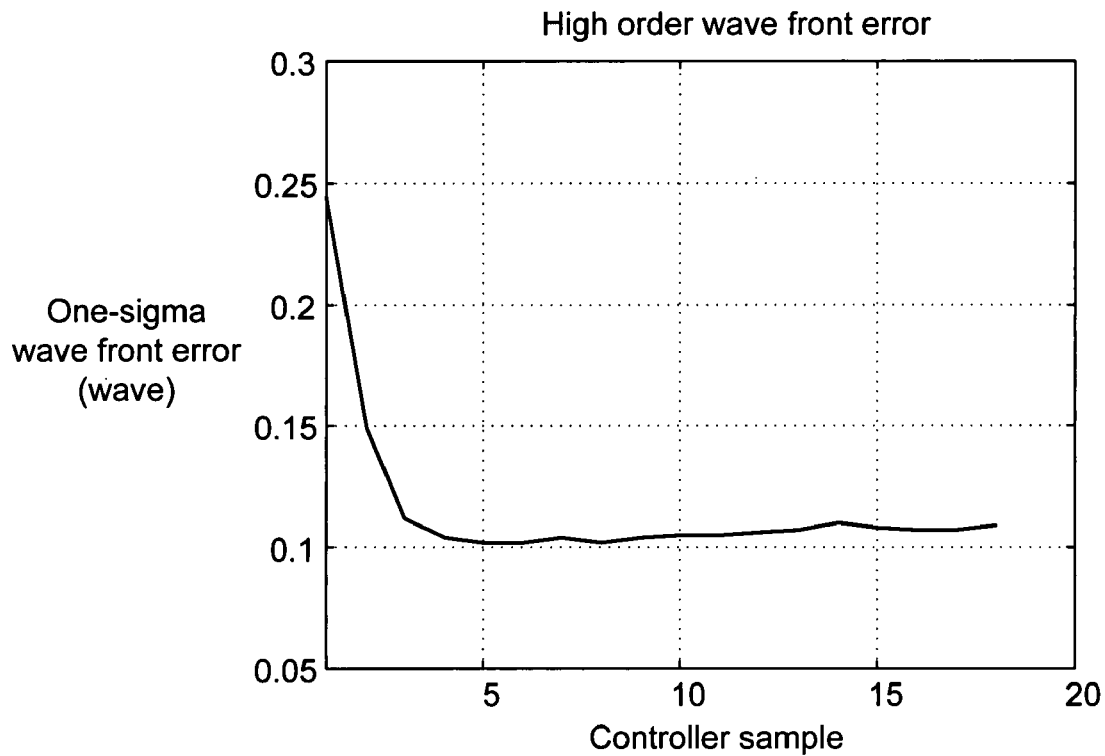
Figure 11:
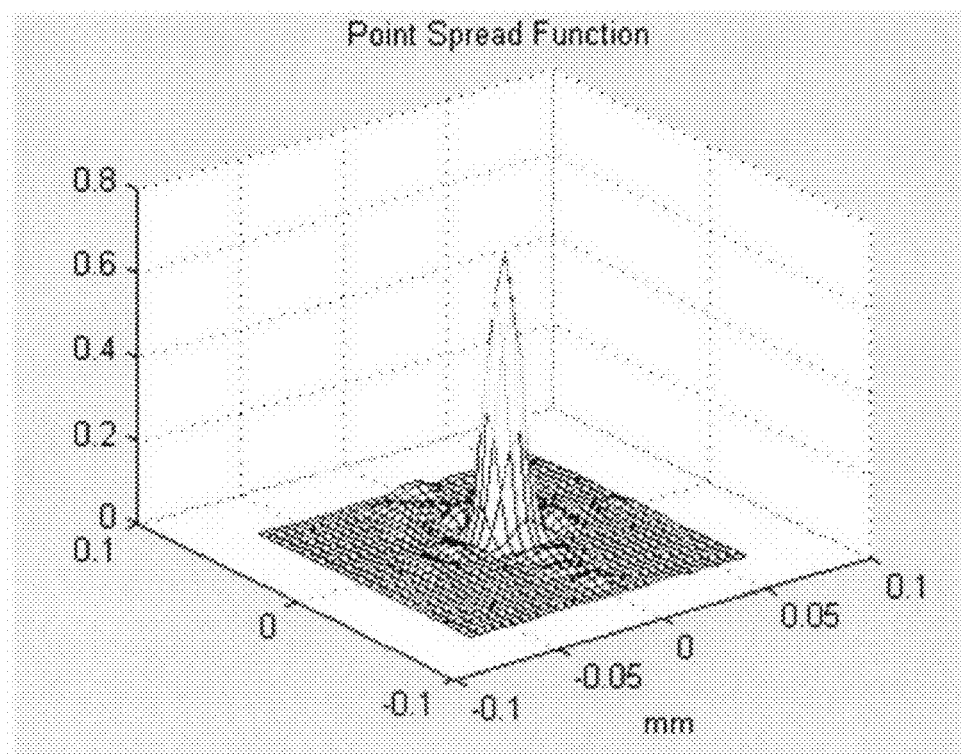
FIG. 11 is a graph illustrating the point spread function of an adaptive optics system in accordance with one aspect of the present invention.
Figure 12:
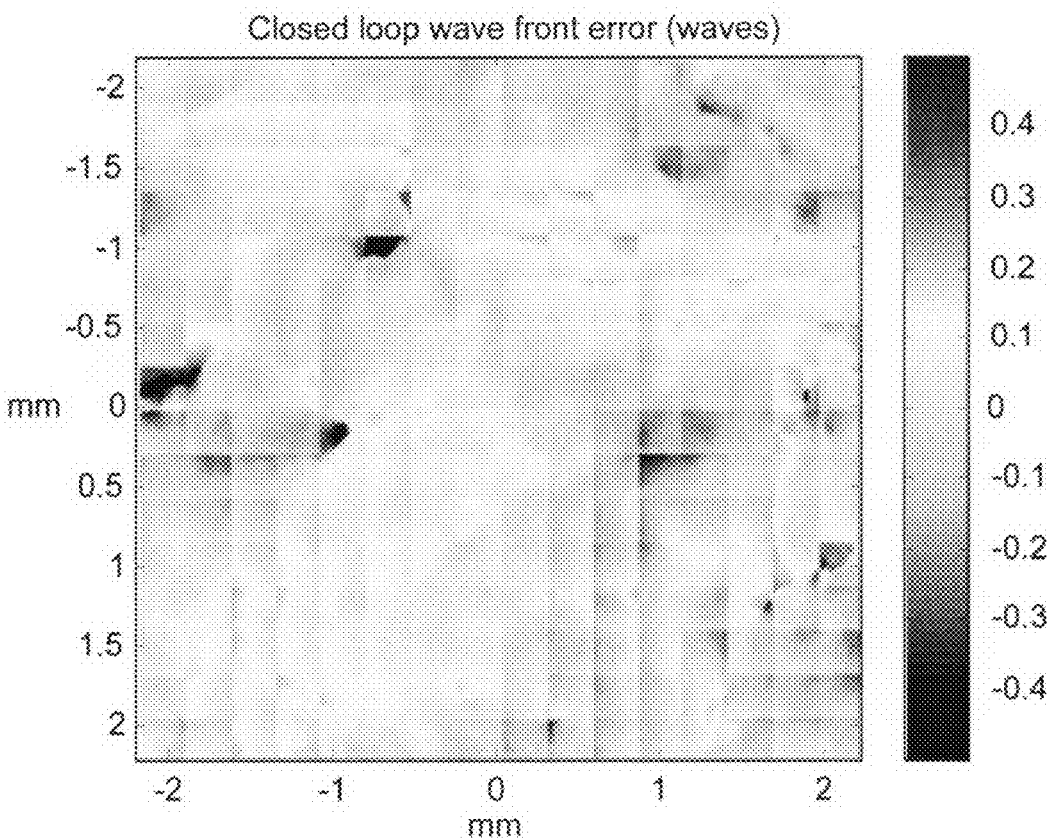
FIG. 12 illustrates the leftover wave front error (in waves) after the adaptive optics correction of the aberrated wave front in accordance with one aspect of the present invention.

Table 1, above, provides the parameters used for the first test case modeled in accordance with one embodiment of the present invention. This test case illustrates the performance of the AO system with the condition $D/r_0$=5.3, which is a typical parameter for many AO operations. FIG. 9 illustrates the dynamic closed loop Strehl ratio for the first test case. After about the first five controller samples, the dynamic Strehl ratio for this test case is about 0.63, which is similar to system with an ideal sensor. FIG. 10 illustrates the one-sigma high order error (in waves) for the first test case. FIG. 11 illustrates the point spread function therefor, and FIG. 12 illustrates the leftover wave front error (in waves) after the adaptive optics correction of the aberrated wave front.

Second Test Case:

TABLE 2

| | |
|---|---|
| Actuator spacing | d = 0.275 mm |
| Aperture width | D = 4.4 mm |
| Turbulent strength | $r_0$ = 0.43 mm |
| Rytov variance | $\sigma_r$ = 1.9 |
| Sampling frequency | $f_s$ = 10 kHz |
| Controller bandwidth | $f_{bw}$ = 1 kHz |
| Greenwood frequency | $f_G$ = 1.2 kHz |
| Tyler frequency | $f_T$ = 0.17 kHz |

Table 2, above, provides the parameters used for the second test case modeled in accordance with one embodiment of the present invention. This test case illustrates the performance of the AO system with the condition $D/r_0$=10.3, which is a very strong scintillated condition.

Figure 13:
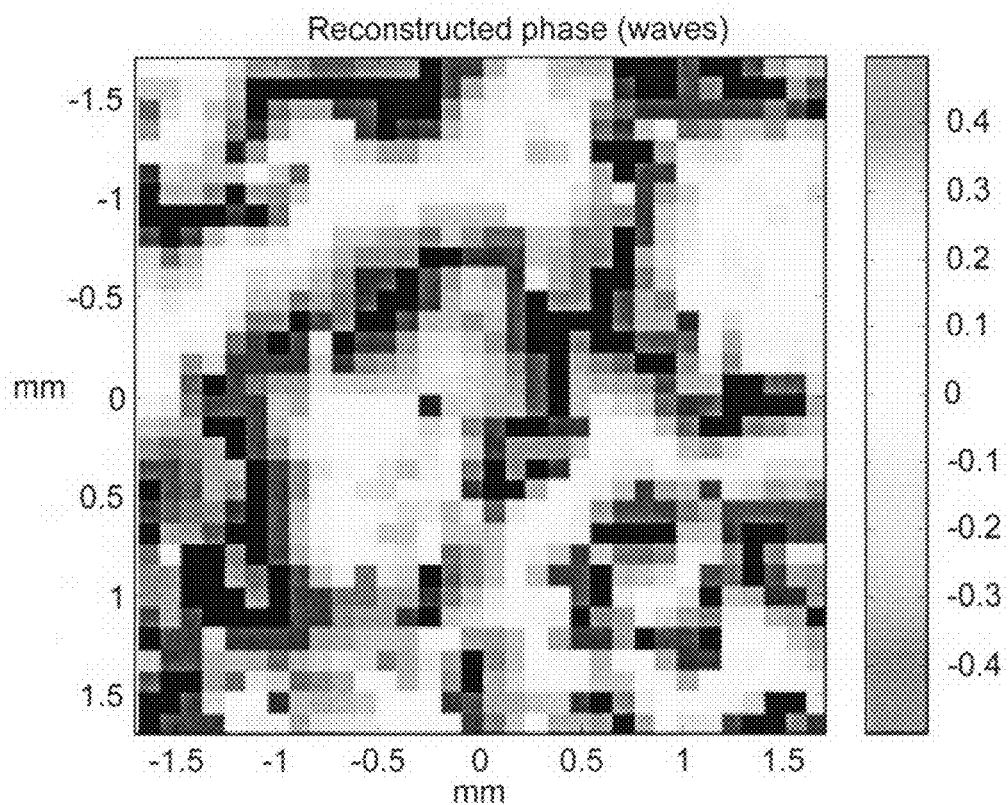
FIGS. 13 and 14 illustrate the phases of a reconstructed wave front and an original aberrated wave front in accordance with one aspect of the present invention.
Figure 14:
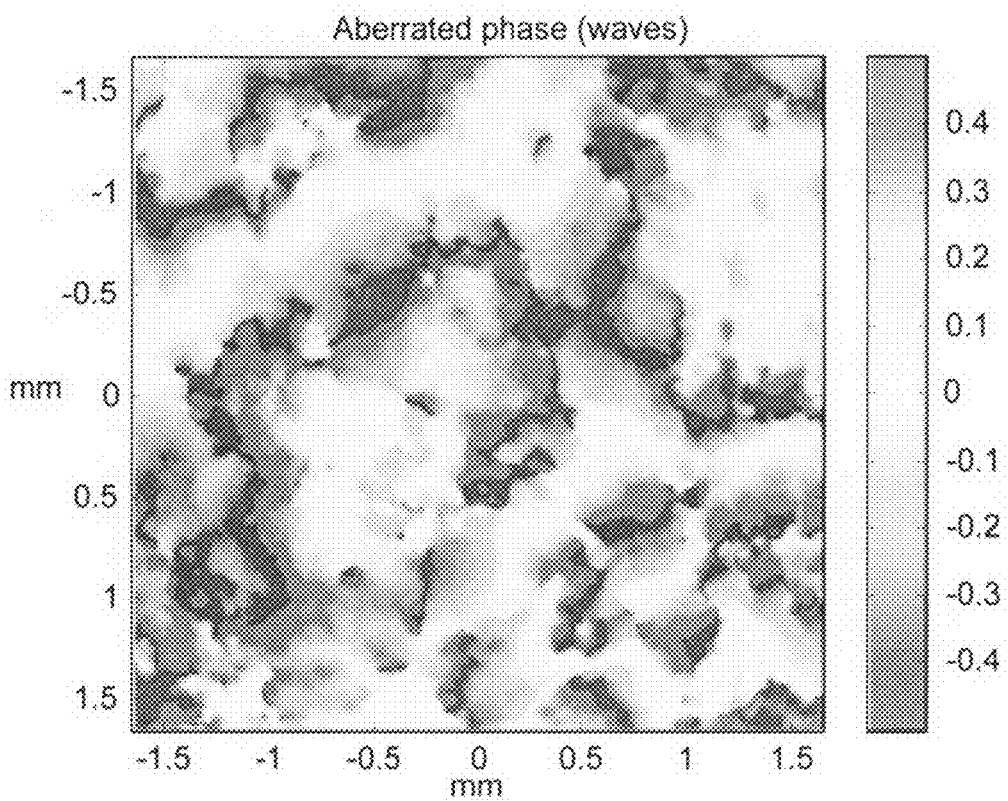
Figure 15:
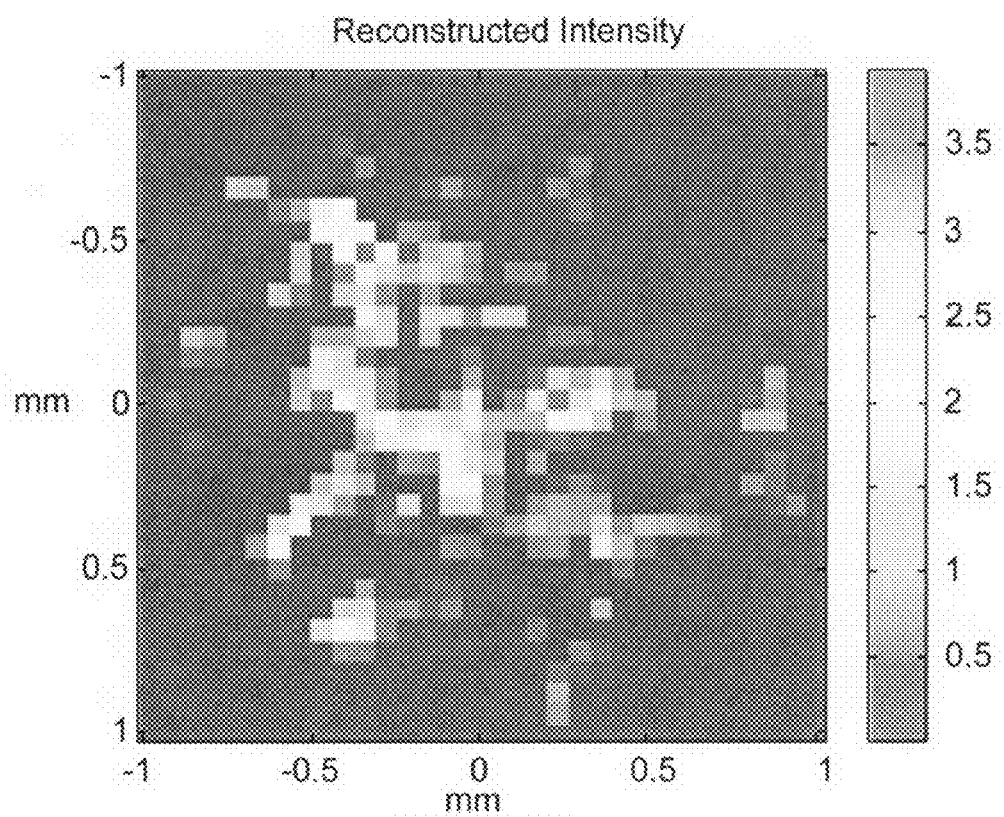
FIGS. 15 and 16 illustrate the amplitudes of a reconstructed wave front and an original aberrated wave front in accordance with one aspect of the present invention.
Figure 16:
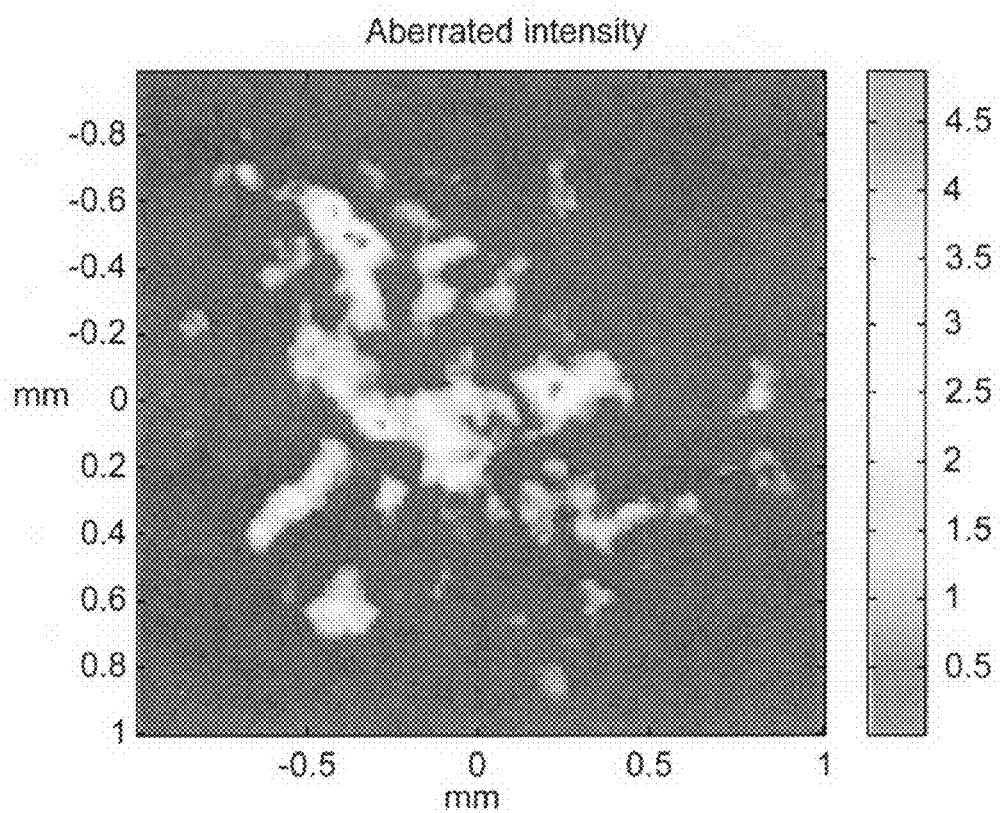

The phase aberrations of the reconstructed 64×64 pixel wave front for the second test case are shown in FIG. 13. As can be seen when comparing the reconstructed wave front of FIG. 13 with the original aberrated wave front of FIG. 14, the method of the foregoing embodiment of the present invention is capable of very accurately reconstructing the phase information of the wave front of the incoming aberrated beam. Similarly, the intensity aberrations of the same reconstructed wave front are shown in FIG. 15. As can be seen when comparing the reconstructed wave front of FIG. 15 with the original aberrated wave front of FIG. 16, the method of the foregoing embodiment of the present invention is capable of very accurately reconstructing the intensity (i.e., amplitude) information of the wave front of the incoming aberrated beam. The slight differences between these respective pairs of figures are the result of averaging 8×8 incoming pixels into one reconstructed sub-aperture pixel. Nevertheless, the reconstructed pixel values match well with the average values of the incoming pixels.

Figure 17:
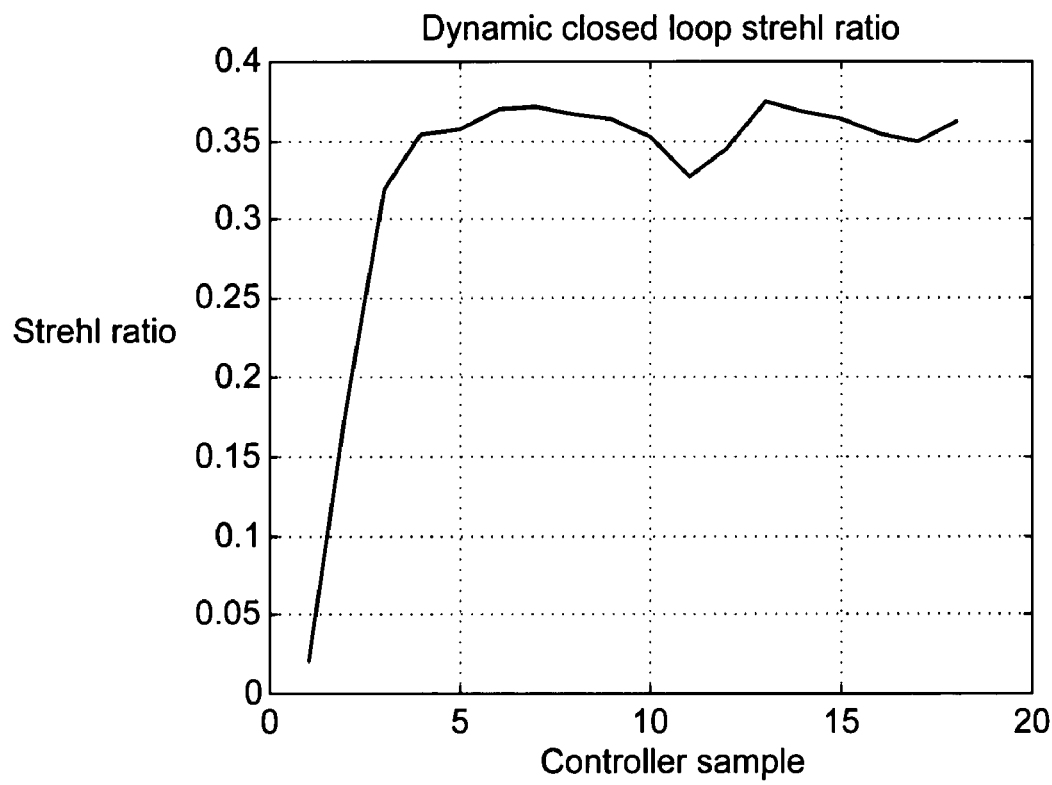
FIGS. 17 and 18 are graphs illustrating various performance advantages of an adaptive optics system in accordance with one aspect of the present invention.
Figure 18:
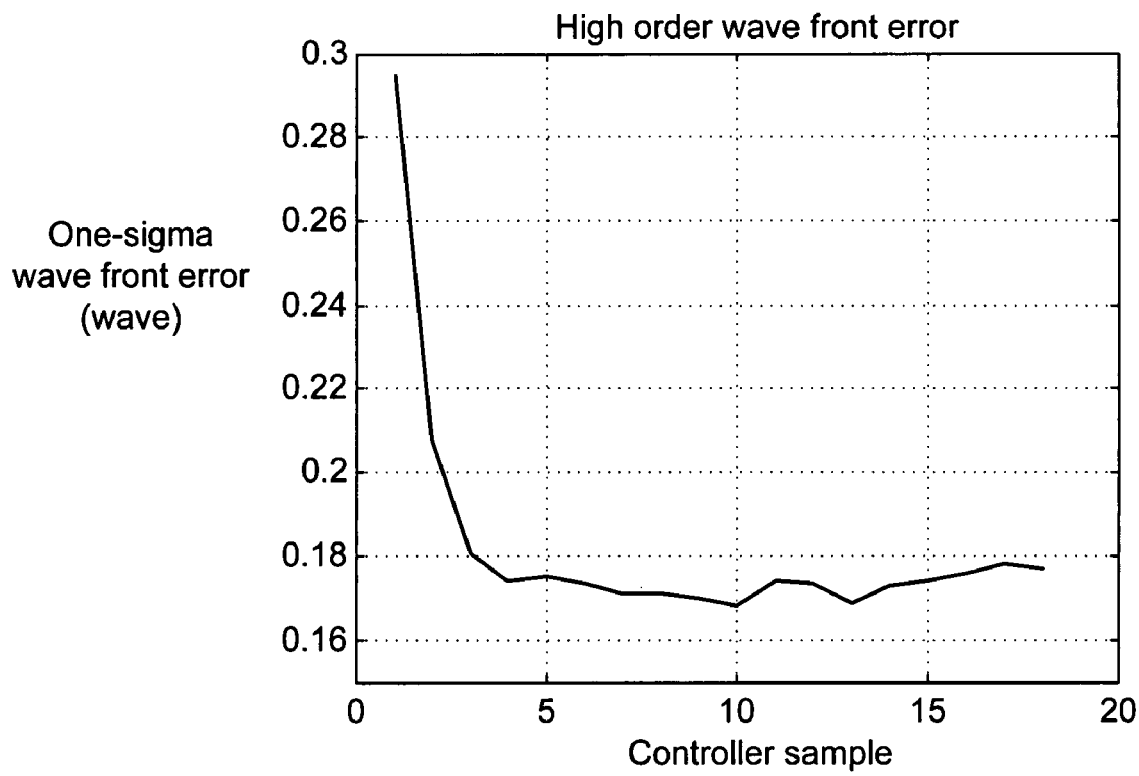
Figure 19:
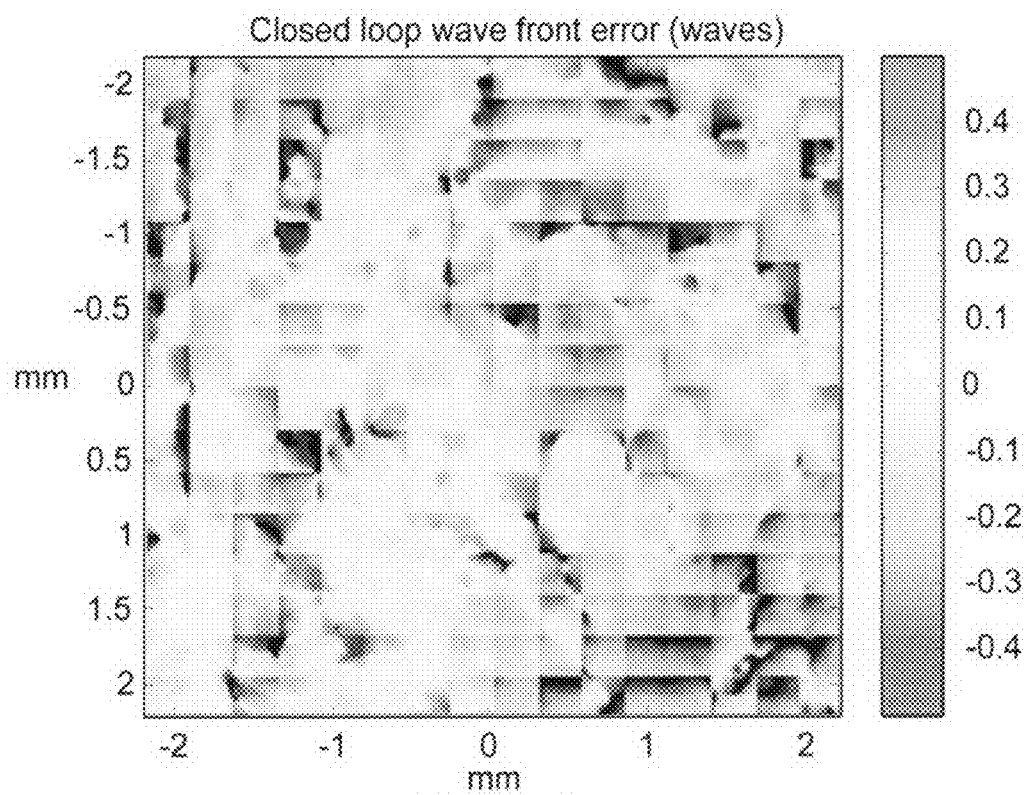
FIG. 19 illustrates the leftover wave front error (in waves) after the adaptive optics correction of the aberrated wave front in accordance with one aspect of the present invention.
Figure 20:
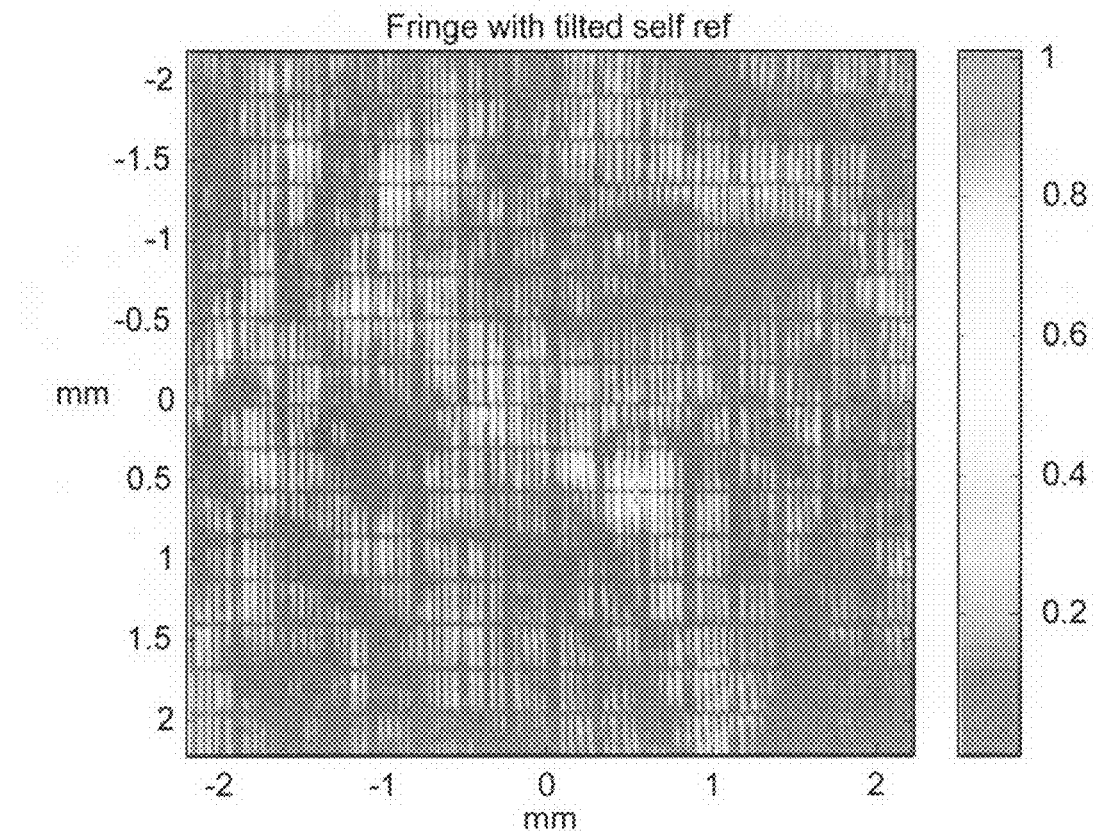
FIG. 20 illustrates an image of a hologram formed in an adaptive optics system in accordance with one aspect of the present invention.

FIG. 17 illustrates the dynamic closed loop Strehl ratio for the second test case. After about the first five controller samples, the dynamic Strehl ratio for this test case is about 0.35, which is similar, for these parameters, to the performance of a system with an ideal sensor. FIG. 18 illustrates the one-sigma high order error (in waves) for the second test case. FIG. 19 illustrates the leftover wave front error (in waves) after the adaptive optics correction of the aberrated wave front for the second test case, and FIG. 20 shows the hologram of the tilted wave front of the second test case in accordance with one aspect of the present invention.

Third Test Case:

TABLE 3

| | |
|---|---|
| Actuator spacing | d = 0.275 mm |
| Aperture width | D = 4.4 mm |
| Turbulent strength | $r_0$ = 0.83 mm |
| Rytov variance | $\sigma_r$ = 0.62 |
| Sampling frequency | $f_s$ = 10 kHz |
| Controller bandwidth | $f_{bw}$ = 1 kHz |
| Greenwood frequency | $f_G$ = 0.63 kHz |
| Tyler frequency | $f_T$ = 0.1 kHz |
| Signal-to-noise ratio | SNR = 1 |
| Sensor resolution | 8 bit |

Figure 21:
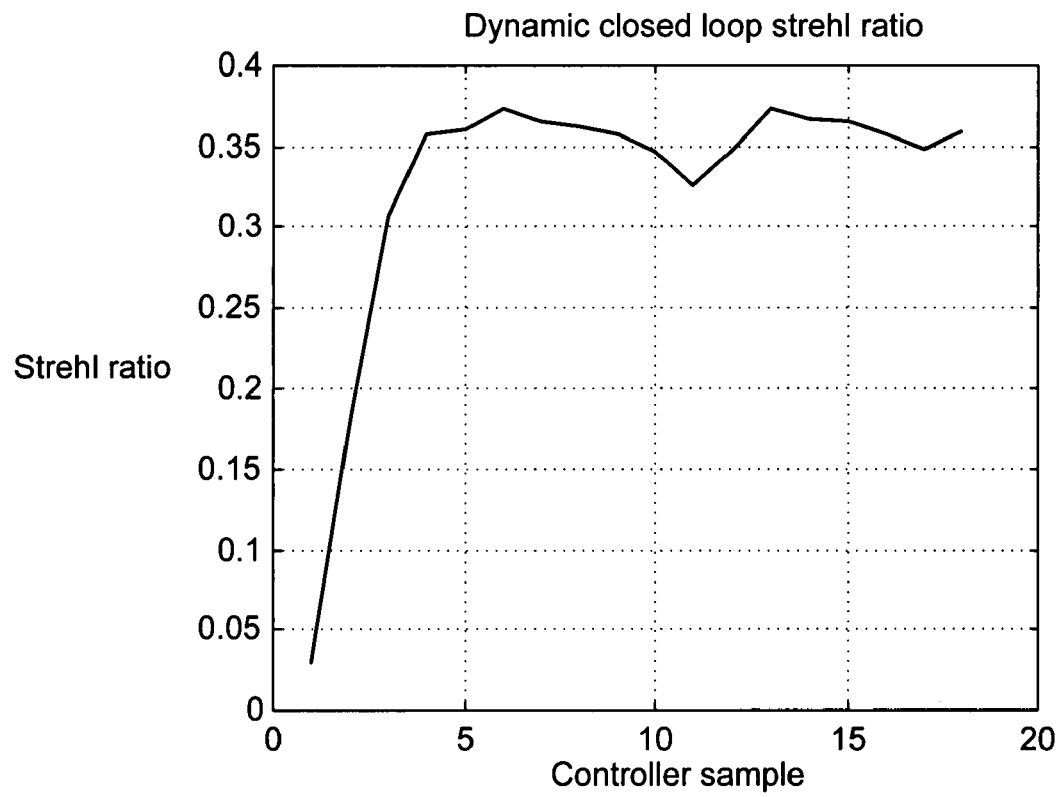
FIGS. 21 and 22 are graphs illustrating various performance advantages of an adaptive optics system in accordance with one aspect of the present invention.
Figure 22:
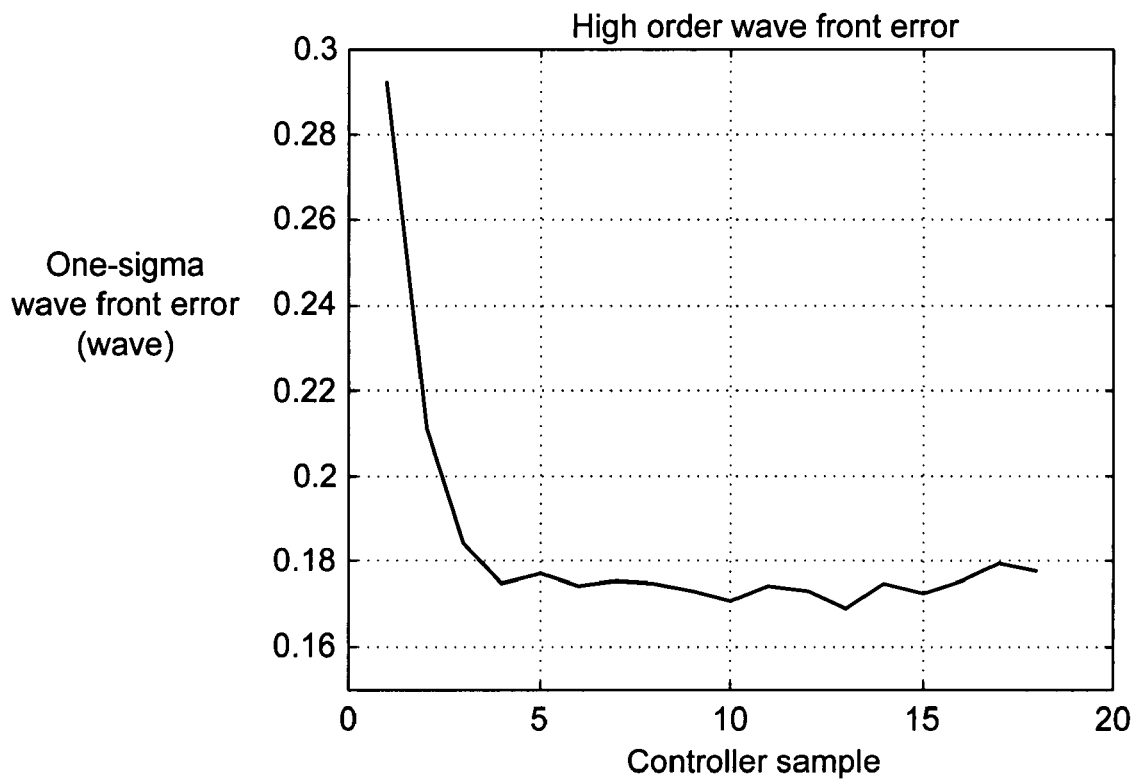
Figure 23:
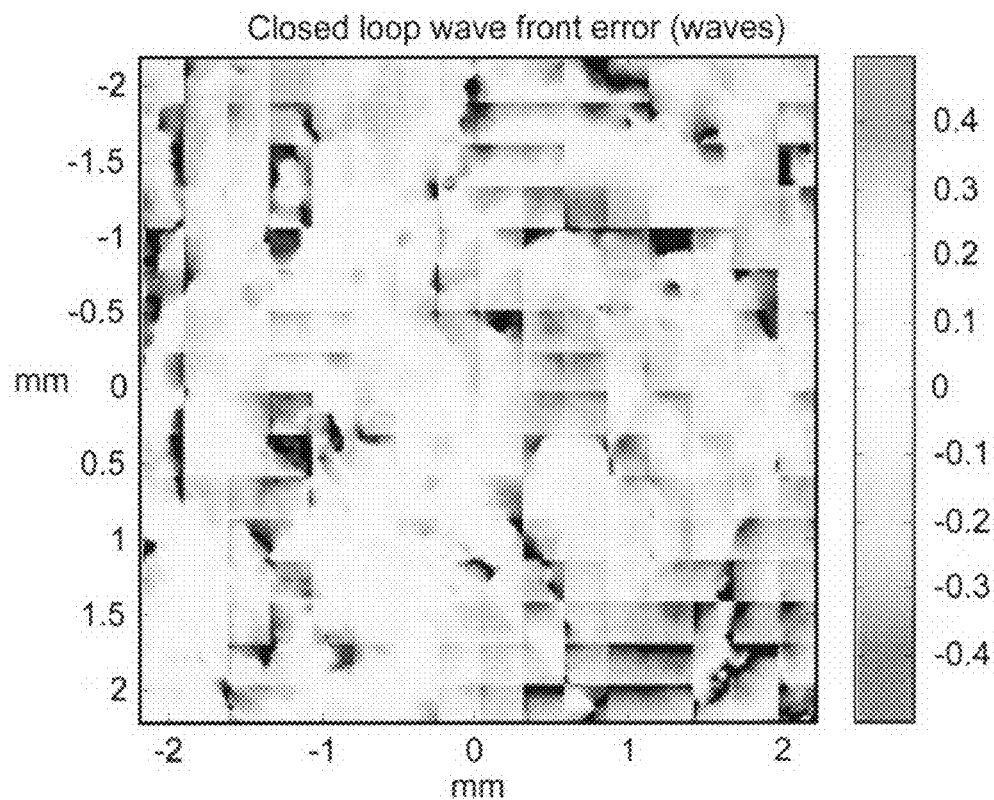
FIG. 23 illustrates the leftover wave front error (in waves) after the adaptive optics correction of the aberrated wave front in accordance with one aspect of the present invention.

Table 3, above, provides the parameters used for the third test case modeled in accordance with one embodiment of the present invention. This test case illustrates the performance of the AO system with the condition $D/r_0$=10.3. For this third test case, the sensor full scale $S_{fs}$ is equal to four times the maximum fringe intensity. FIG. 21 illustrates the dynamic closed loop Strehl ratio for the third test case. After about the first five controller samples, the dynamic Strehl ratio for this test case is about 0.35. FIG. 22 illustrates the one-sigma high order error (in waves) for the third test case. FIG. 23 illustrates the leftover wave front error (in waves) after the adaptive optics correction of the aberrated wave front, and FIG. 24 shows the hologram of the tilted wave front of the third test case in accordance with one aspect of the present invention.

Figure 24:
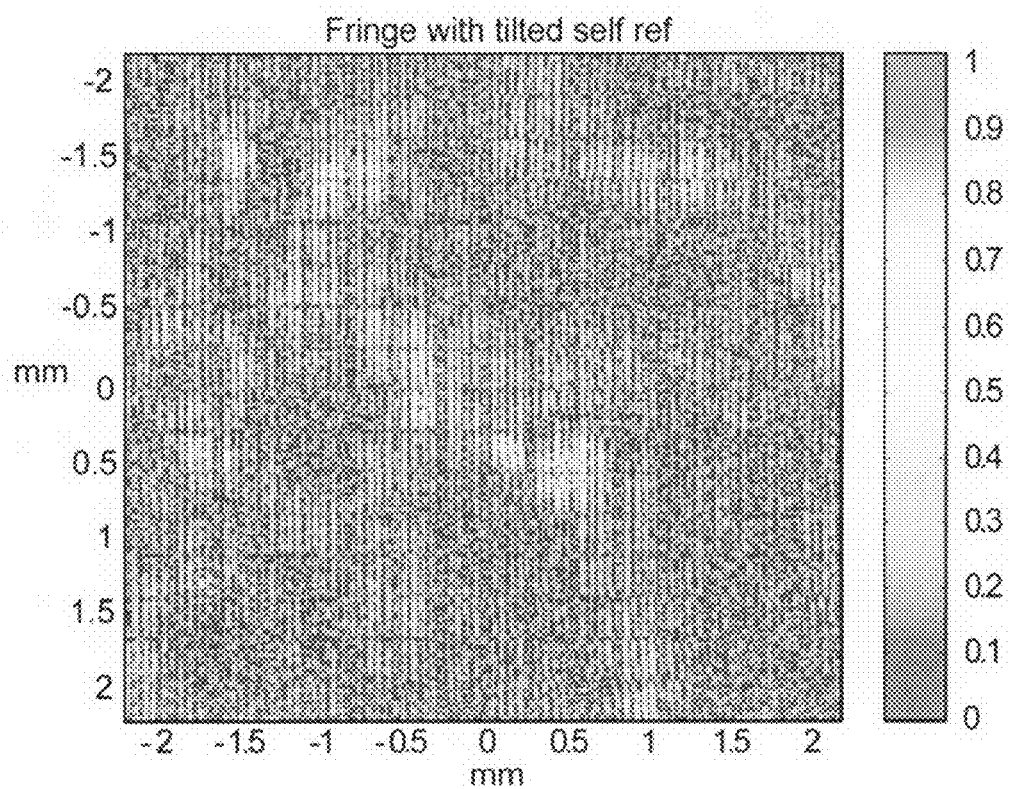
FIG. 24 illustrates an image of a hologram formed in an adaptive optics system in accordance with one embodiment of the present invention.

As shown in FIG. 24, the added noise has a very significant effect. For the condition SNR=1, the average noise power is equal to that of the incoming wave front power. The spatial low pass filter desensitizes the wave front error with respect to both noise and quantization. In addition, the averaging process of converting the reconstructed wave front from 64×64 to 16×16 also further reduces the sensitivity by a factor of 4. In this third test case, the 8-bit sensor resolution was selected to minimize the data transfer time between the camera and the microprocessor. Simulation results indicate that the AO system still performs well with 6-bit resolution.

Figure 25:
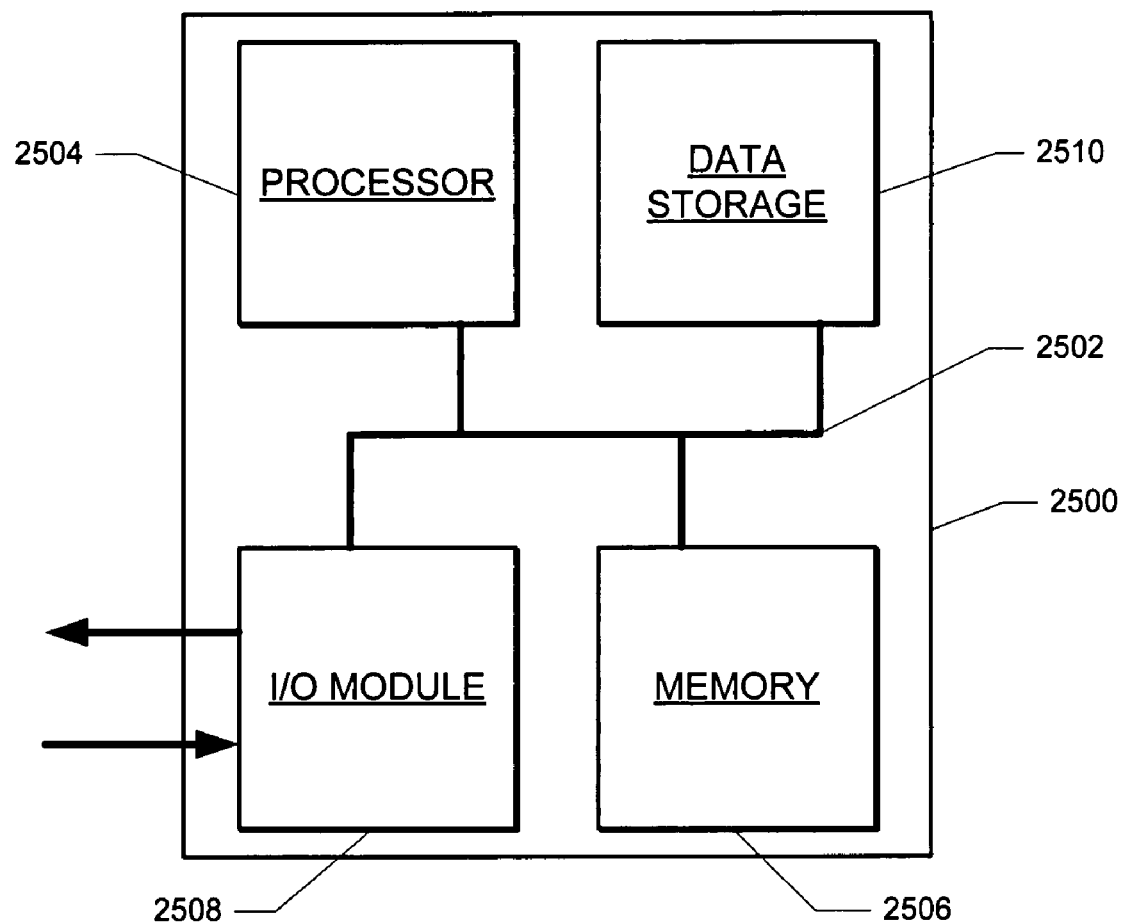
FIG. 25 is a block diagram that illustrates a computer system with which the present invention may be implemented in accordance with one embodiment of the present invention.

FIG. 25 is a block diagram that illustrates a computer system 2500 upon which an embodiment of the present invention may be implemented. Computer system 2500 includes a bus 2502 or other communication mechanism for communicating information, and a processor 2504 coupled with bus 2502 for processing information. Computer system 2500 also includes a memory 2506, such as a random access memory ("RAM") or other dynamic storage device, coupled to bus 2502 for storing information and instructions to be executed by processor 2504. Memory 2506 may also be used for storing temporary variable or other intermediate information during execution of instructions to be executed by processor 2504. Computer system 2500 further includes a data storage device 2510, such as a magnetic disk or optical disk, coupled to bus 2502 for storing information and instructions.

Computer system 2500 may be coupled via I/O module 2508 to a display device (not illustrated), such as a cathode ray tube ("CRT") or liquid crystal display ("LCD") for displaying information to a computer user. An input device, such as, for example, a keyboard or a mouse may also be coupled to computer system 2500 via I/O module 2508 for communicating information and command selections to processor 2504.

According to one embodiment of the invention, performing closed loop correction of phase aberrations is performed by a computer system 2500 in response to processor 2504 executing one or more sequences of one or more instructions contained in memory 2506. Such instructions may be read into memory 2506 from another machine-readable medium, such as data storage device 2510. Execution of the sequences of instructions contained in main memory 2506 causes processor 2504 to perform the process steps described herein. One or more processors in a multi-processing arrangement may also be employed to execute the sequences of instructions contained in memory 2506. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 2504 for execution. Such a medium may take many forms, including, but not limited to, non-volatile media, volatile media, and transmission media. Non-volatile media include, for example, optical or magnetic disks, such as data storage device 2510. Volatile media include dynamic memory, such as memory 2506. Transmission media include coaxial cables, copper wire, and fiber optics, including the wires that comprise bus 2502. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. An adaptive optics system comprising:
   a beamsplitter configured to divide an incoming beam with an aberrated wave front into a first input beam and a second input beam;
   a microelectromechanical system configured to reflect the first input beam onto an image plane;
   a self-reference wave front generator configured to spatially filter the second input beam to form a reference beam, and to interfere the reference beam with the first input beam on the image plane to form a hologram;
   an imaging device configured to capture an image of the hologram on the image plane; and
   one or more processors configured to perform the steps of:
      Fourier transforming the captured image to generate a transform including a first object image, a conjugate object image, and an auto-correlation image,
      truncating the transform to exclude the conjugate object image and the auto-correlation image,
      inverse Fourier transforming the truncated transform to generate amplitude and phase information about the aberrated wave front,
      generating control signals for mitigating aberrations in the aberrated wave front via phase conjugation based on the amplitude and phase information, and
      providing the control signals to the microelectromechanical system.

2. The adaptive optics system of claim 1, wherein the self-reference wave front generator comprises a single mode fiber.

3. The adaptive optics system of claim 2, wherein the self-reference wave front generator further comprises an amplifier.

4. The adaptive optics system of claim 2, wherein the self-reference wave front generator further comprises a programmable phase shifter configured to tilt the reference beam by a predetermined amount $\phi_{tilt}$.

5. The adaptive optics system of claim 2, wherein the self-reference wave front generator further comprises a tilted mirror configured to tilt the reference beam by a predetermined amount $\phi_{tilt}$.

6. The adaptive optics system of claim 1, wherein the microelectromechanical system is a 1024 actuator microelectromechanical system.

7. The adaptive optics system of claim 1, wherein the captured image is a 256×256 pixel image.

8. The adaptive optics system of claim 1, wherein the truncated transform is a 64×64 pixel image.

9. The adaptive optics system of claim 1, wherein an execution time of the steps of Fourier transforming the captured image, truncating the transform, inverse Fourier transforming the truncated transform and providing control signals to the microelectromechanical system is less than 100 µs.

10. The adaptive optics system of claim 1, wherein the microelectromechanical system has a square aperture.

11. A method of performing closed loop correction of phase aberrations, comprising the steps of:
   dividing an incoming beam with an aberrated wave front into a first input beam and a second input beam;
   reflecting, with a microelectromechanical system, the first input beam onto an image plane;
   spatially filtering the second input beam to form a reference beam;
   interfering the reference beam with the first input beam on the image plane to form a hologram;
   capturing an image of the hologram on the image plane;
   Fourier transforming the captured image to generate a transform including a first object image, a conjugate object image, and an auto-correlation image;
   truncating the transform to exclude the conjugate object image and the auto-correlation image;
   inverse Fourier transforming the truncated transform to generate amplitude and phase information about the aberrated wave front;
   generating control signals for mitigating aberrations in the aberrated wave front via phase conjugation based on the amplitude and phase information, and
   providing the control signals to the microelectromechanical system.

12. The method of claim 11, further comprising the step of tilting the reference beam by a predetermined amount $\phi_{tilt}$.

13. The method of claim 11, further comprising the step of amplifying the reference beam.

14. The method of claim 11, wherein the microelectromechanical system is a 1024 actuator microelectromechanical system.

15. The method of claim 11, wherein the captured image is a 256×256 pixel image.

16. The method of claim 11, wherein the truncated transform is a 64×64 pixel image.

17. The method of claim 11, wherein an execution time of the steps of Fourier transforming the captured image, truncating the transform, inverse Fourier transforming the truncated transform and providing control signals to the microelectromechanical system is less than 100 μs.

18. A machine-readable medium carrying one or more sequences of instructions for performing closed loop correction of phase aberrations, wherein execution of the one or more sequences of instructions by one or more processors causes the one or more processors to perform the steps of:

capturing an image of a hologram formed by interfering a first input beam with a desirably tilted reference beam;

Fourier transforming the captured image to generate a transform including a first object image, a conjugate object image, and an auto-correlation image;

truncating the transform to exclude the conjugate object image and the auto-correlation image;

inverse Fourier transforming the truncated transform to generate amplitude and phase information about an aberrated wave front of the first input beam;

generating control signals for mitigating aberrations in the aberrated wave front via phase conjugation based on the amplitude and phase information, and providing the control signals to a microelectromechanical system.

19. The machine-readable medium of claim 18, further comprising the step of tilting the reference beam by a predetermined amount $\phi_{tilt}$.

20. The machine-readable medium of claim 18, further comprising the step of amplifying the reference beam.

* * * * *